United States Patent
Shiroma et al.

(10) Patent No.: US 12,536,896 B2
(45) Date of Patent: Jan. 27, 2026

(54) ESTIMATION DEVICE, ESTIMATION METHOD, AND ESTIMATION PROGRAM

(71) Applicant: NTT, Inc., Tokyo (JP)

(72) Inventors: Yuki Shiroma, Tokyo (JP); Natsuko Hikage, Tokyo (JP); Kumiko Omori, Tokyo (JP)

(73) Assignee: NTT, Inc., Tokyo (JP)

( * ) Notice: Subject to any disclaimer, the term of this patent is extended or adjusted under 35 U.S.C. 154(b) by 90 days.

(21) Appl. No.: 18/283,341

(22) PCT Filed: Mar. 25, 2021

(86) PCT No.: PCT/JP2021/012756
§ 371 (c)(1),
(2) Date: Sep. 21, 2023

(87) PCT Pub. No.: WO2022/201477
PCT Pub. Date: Sep. 29, 2022

(65) Prior Publication Data
US 2024/0096206 A1    Mar. 21, 2024

(51) Int. Cl.
*G08B 31/00* (2006.01)
*H04L 41/12* (2022.01)

(52) U.S. Cl.
CPC ............. *G08B 31/00* (2013.01); *H04L 41/12* (2013.01)

(58) Field of Classification Search
CPC ................................. G08B 31/00; H04L 41/12
See application file for complete search history.

(56) References Cited

U.S. PATENT DOCUMENTS

| | | | |
|---|---|---|---|
| 10,616,043 B2 * | 4/2020 | Wang | H04L 41/12 |
| 2015/0030328 A1 | 1/2015 | Fukuda et al. | |
| 2015/0215034 A1 * | 7/2015 | Kotani | H04B 10/0773 398/2 |
| 2019/0361759 A1 * | 11/2019 | Haugen | G06F 11/0772 |
| 2019/0379577 A1 * | 12/2019 | Tiwari | H04L 41/069 |

(Continued)

FOREIGN PATENT DOCUMENTS

| | | |
|---|---|---|
| JP | 2007166446 A | 6/2007 |
| WO | 2013125002 A1 | 8/2013 |

OTHER PUBLICATIONS

Nippon Telegraph and Telephone Corporation (2020) "Optical wiring method (optical access equipment)" literature [online] Accessed on Mar. 3, 2021, website: https://www.ntt.co.jp/rd-disc/nttrd/disclosure/files/senro/f-8.pdf.

*Primary Examiner* — Steven Lim
*Assistant Examiner* — James E Munion

(57) ABSTRACT

An estimation device (10) includes: a collection unit (11) configured to collect alarms which are issued when a device constituting connection equipment is in an abnormal state, the connection equipment connecting a building in which telecommunication equipment is accommodated to an ONU disposed in a house of an individual user, and including a cable having a plurality of first core wires branched by a 4SP, an 8SP for branching the first core wire into a plurality of second core wires, and equipment that connects the second core wire to the ONU; and an estimation unit (12) configured to estimate in which section of the connection equipment a failure has occurred, based on a type of the collected alarm and the equipment for which the alarm has been issued.

18 Claims, 27 Drawing Sheets

(56) References Cited

U.S. PATENT DOCUMENTS

| | | | |
|---|---|---|---|
| 2020/0112489 A1* | 4/2020 | Scherger | G06F 11/3409 |
| 2021/0273844 A1* | 9/2021 | Xie | H04L 41/0654 |
| 2022/0029876 A1* | 1/2022 | Mercian | H04L 41/0654 |

* cited by examiner

Fig. 5

ITEMS OF DEVICE LOGS
  • TIME STAMP (yyyymmdd hh:mm:ss FORMAT)
  • LINE ACCOMMODATION POSITION
    (PACKAGE NUMBER, SLOT NUMBER, PORT NUMBER)
  • ALARM NAME
  • ALARM GENERATION CLASSIFICATION (GENERATION/RECOVERY)

Fig. 8

| STEP | DETERMINATION CONDITIONS |
|------|--------------------------|
| S21 | SERVICE DISCONNECTIONS THAT HAVE OCCURRED AT SAME TIME (WITHIN 5 SECONDS BEFORE AND AFTER) AT TWO OR MORE PORTS INCLUDING CORRESPONDING PORT OUT OF EIGHT PORTS IS ALSO CURRENTLY CONTINUING (SERVICE DISCONNECTIONS THAT CONTINUE TO THIS MOMENT ARE OCCURRING AT TWO OR MORE PORTS OUT OF EIGHT PORTS IN VICINITY OF HOST PORT, AND ABSOLUTE VALUE OF DIFFERENCE IS WITHIN 5 SECONDS WHEN COMBINING SERVICE DISCONNECTION OCCURRENCE TIMES TWO BY TWO) |
| S22 | IN SLOT PORTS (24 PORTS FOR COMPANY A, AND 512−8=504 PORTS FOR COMPANY B) OTHER THAN VICINITY OF HOST PORT, THERE ARE SERVICE DISCONNECTIONS OCCURRING WITHIN 5 SECONDS BEFORE AND AFTER TIME OF SERVICE DISCONNECTION OCCURRING IN STEP S21, AND SERVICE DISCONNECTIONS ARE CONTINUING TO THIS MOMENT |

Fig. 10

| STEP | DETERMINATION CONDITIONS |
|---|---|
| S31 | UPLINK ERROR DEGRADATION HAS OCCURRED ONE OR MORE TIMES AT FIVE OR MORE PORTS OUT OF 32 PORTS SUBORDINATE TO 4SP IN THREE DAYS |
| S32 | THERE IS USER WHOSE SUSPICION FLAG IS "1" |
| S33 | SUSPICION FLAG IS SET TO LESS THAN TWO PORTS IN 8SP AND USER HIMSELF OR HERSELF IS SUSPICIOUS→(1)<br>SUSPICION FLAG IS SET TO LESS THAN TWO PORTS AT 8SP AND USER HIMSELF OR HERSELF IS NOT SUSPICIOUS→(2)<br>SUSPICION FLAG IS SET TO THREE PORTS OR MORE IN 8SP→(3) |

Fig. 12

| STEP | DETERMINATION CONDITIONS |
|---|---|
| S51 | DOWNLINK ERROR DEGRADATION OR SERVICE DISCONNECTION HAS OCCURRED FOUR OR MORE TIMES (SUM OF TWO TYPES) AT FIVE OR MORE PORTS OUT OF 32 PORTS SUBORDINATE TO 4SP IN THREE DAYS |
| S52 | SAME AS S32 |
| S53 | SAME AS S33 |
| S62 | DOWNLINK ERROR DEGRADATION OR SERVICE DISCONNECTION HAS OCCURRED AT TWO OR MORE PORTS OUT OF EIGHT PORTS OF LINE FOUR OR MORE TIMES IN THREE DAYS |

Fig. 14

| STEP | DETERMINATION CONDITIONS |
|---|---|
| S71 | ONU POWER DISCONNECTION HAS OCCURRED AT ITS OWN PORT FOUR OR MORE TIMES IN 31 DAYS |
| S74 | SERVICE DISCONNECTION, UPLINK ERROR DEGRADATION, OR DOWNLINK ERROR DEGRADATION HAS OCCURRED FOUR OR MORE TIMES (SUM OF THREE TYPES OF APPEARANCE TIMES) IN THREE DAYS AT ITS OWN PORT |
| S77 | IN CASE OF PRODUCT MANUFACTURED BY COMPANY A IN WHICH THERE IS EVENT IN WHICH SERVICE DISCONNECTION CONTINUES FOR 30 MINUTES OR MORE AT ITS OWN PORT WITHIN TEN DAYS, SERVICE DISCONNECTION CAUSED DUE TO ONU POWER DISCONNECTION IS EXCLUDED |
| S80 | ONU POWER DISCONNECTION OCCURRED 30 MINUTES OR MORE BEFORE AT ITS OWN PORT AND THERE IS NO LOG OF ONU DISCONNECTION RECOVERY UP TO THIS MOMENT |
| S83 | AT LEAST ONE LOG HAS BEEN OUTPUT WITHIN MOST RECENT 31 DAYS AT ITS OWN PORT |

Fig. 16

| | |
|---|---|
| 2020/06/06 13:15:33 [ONU] USR=9028 MAC=38E08EB6C4DD LLID=17 :ONU Power ON. | |
| 2020/06/06 16:46:56 [COMM] USR=9027 MAC=00A0CAD9737F LLID=9 :Service Down. | |
| 2020/06/06 16:46:57 [COMM] USR=9030 MAC=00A0CAEB73BE LLID=12 :Service Down. | |
| 2020/06/06 16:46:57 [COMM] USR=9032 MAC=002692C1B03A LLID=2 :Service Down. | |
| 2020/06/06 16:46:57 [COMM] USR=9028 MAC=38E08EB6C4DD LLID=17 :Service Down. | |
| 2020/06/07 11:28:25 [COMM] USR=9032 MAC=002692C1B03A LLID=12 :Service Down rec. | |
| 2020/06/07 11:28:27 [COMM] USR=9030 MAC=00A0CAEB73BE LLID=17 :Service Down rec. | |
| 2020/06/07 12:35:33 [COMM] USR=9027 MAC=00A0CAD9737F LLID=9 :Service Down rec. | |
| 2020/06/07 16:17:41 [COMM] USR=9028 MAC=38E08EB6C4DD LLID=2 :Service Down rec. | |
| 2020/06/07 17:32:26 [COMM] USR=9028 MAC=38E08EB6C4DD LLID=2 :Service Down rec. | |
| 2020/06/07 17:32:26 [ONU] USR=9028 MAC=38E08EB6C4DD LLID=2 :ONU Power OFF. | |

Fig. 17

2020/05/28 22:10:43 [ONU] USR=9017 MAC=0800701ED0D5 LLID=1 :ONU Power ON.
2020/06/06 16:46:56 [COMM] USR=9026 MAC=38E08ECE8CB2 LLID=5 :Service Down.
2020/06/07 11:28:26 [COMM] USR=9026 MAC=38E08ECE8CB2 LLID=5 :Service Down rec.

ESTIMATION DEVICE, ESTIMATION METHOD, AND ESTIMATION PROGRAM

CROSS-REFERENCE TO RELATED APPLICATIONS

This application is a U.S. 371 Application of International Patent Application No. PCT/JP2021/012756, filed on 25 Mar. 2021, the disclosure of which is hereby incorporated herein by reference in its entirety.

TECHNICAL FIELD

The present invention relates to an estimation device, an estimation method, and an estimation program.

BACKGROUND ART

In a range from a building for accommodating telecommunication equipment to a residential area of a user, there is a large amount of equipment in many cases. For example, as in Patent Literature 1, in the range, in some cases, there is main line system equipment including a cable having a large number of core wires, wiring system equipment including one core wire out of a large number of core wires and a core wire obtained by branching one core wire into a plurality of core wires (hereinafter referred to as a drop cable), a terminal device (optical network unit (ONU)) installed in a residential area of a user, and the like.

CITATION LIST

Non Patent Literature

Non Patent Literature 1: Nippon Telegraph and Telephone Corporation, Optical wiring method (optical access equipment), [online], [retrieved on Mar. 3, 2021], Internet <URL:https://www.ntt.co.jp/rd-disc/nttrd/disclosure/files/senro/f-8.pdf>

SUMMARY OF INVENTION

Technical Problem

In such equipment, devices capable of issuing an alarm when a failure occurs have restrictions. For example, in a case where the cable is disconnected, the cable itself cannot issue an alarm, and thus the device connected by the cable issues an alarm. By analyzing this alarm, it may be possible to determine which part has failed. However, currently, a skilled operator often refers to a combination of alarms that have been issued to determine a failed part. In addition, in a case where the determination is made only by the alarm at a certain point of time and in a case where the entire history of alarms is viewed going back in time, the details of determination of failed parts may be misunderstood.

In addition, in a case where a failed part cannot be identified, a worker is dispatched to a section where there is a possibility of failure, and the failed part may be identified by a testing machine or visual observation. In addition to an increase in labor costs and financial costs due to the dispatch of workers, the number of workers itself is reduced. Therefore, there is a need for a technology for identifying a specific failed part from an acquired alarm such that the number of times of dispatching workers can be reduced.

The present invention has been made in view of the above, and an object thereof is to provide an estimation device, an estimation method, and an estimation program capable of estimating in which section of connection equipment that connects a building in which telecommunication equipment is accommodated to a terminal device in a user's house a failure has occurred.

Solution to Problem

In order to solve the above-described problems and achieve the object, an estimation device according to the present invention, includes: a collection unit configured to collect alarms which are issued when a device constituting connection equipment is in an abnormal state, the connection equipment connecting a building in which telecommunication equipment is accommodated to a terminal device disposed in a house of an individual user, and including a cable having a plurality of first core wires branched by first branch equipment, second branch equipment for branching the first core wire into a plurality of second core wires, and equipment that connects the second core wire to the terminal device; and an estimation unit configured to estimate in which section of the connection equipment a failure has occurred, based on a type of the collected alarm and the equipment for which the alarm has been issued.

Advantageous Effects of Invention

According to the present invention, it is possible to estimate in which section of connection equipment that connects a building in which telecommunication equipment is accommodated to a terminal device in a user's house a failure has occurred.

BRIEF DESCRIPTION OF DRAWINGS

FIG. 5 is a diagram illustrating an example of items of a device log.

FIG. 8 is a diagram for explaining determination conditions in determination processing illustrated in FIG. 7.

FIG. 10 is a diagram for explaining determination conditions in the determination processing illustrated in FIG. 9.

FIG. 12 is a diagram for explaining determination conditions in the determination processing illustrated in FIG. 11.

FIG. 14 is a diagram for explaining the determination conditions in the determination processing illustrated in FIG. 13.

FIG. 16 is a diagram illustrating an example of device logs.

FIG. 17 is a diagram illustrating an example of device logs.

DESCRIPTION OF EMBODIMENTS

Figure 1:
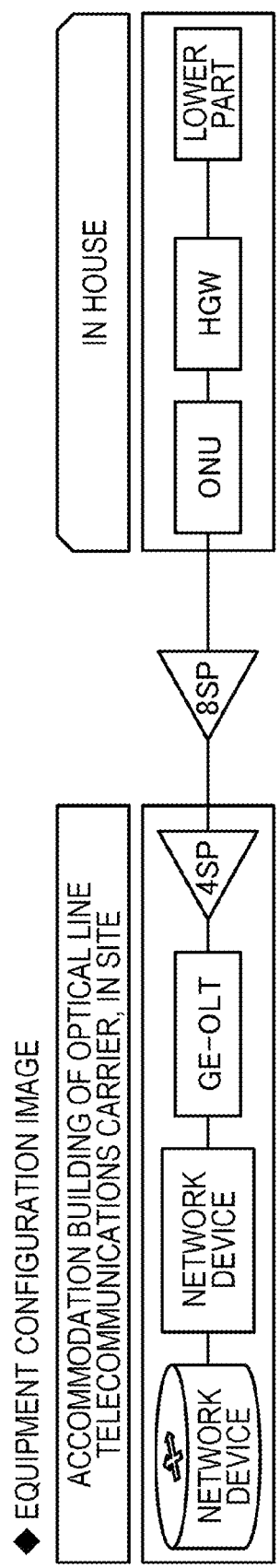
FIG. 1 is a diagram for explaining an outline of connection equipment.

Hereinafter, an embodiment of the present invention will be described in detail with reference to the drawings. Note that the present invention is not limited by this embodiment. Further, in the description of the drawings, the same portions are denoted by the same reference numerals.

Embodiment 1

In the present embodiment, it is estimated in which section of connection equipment that connects an optical line telecommunications carrier side accommodation building to an ONU in a user's house a failure has occurred based on device logs collected by a network management system or the like.

[Connection Equipment]

Figure 2:
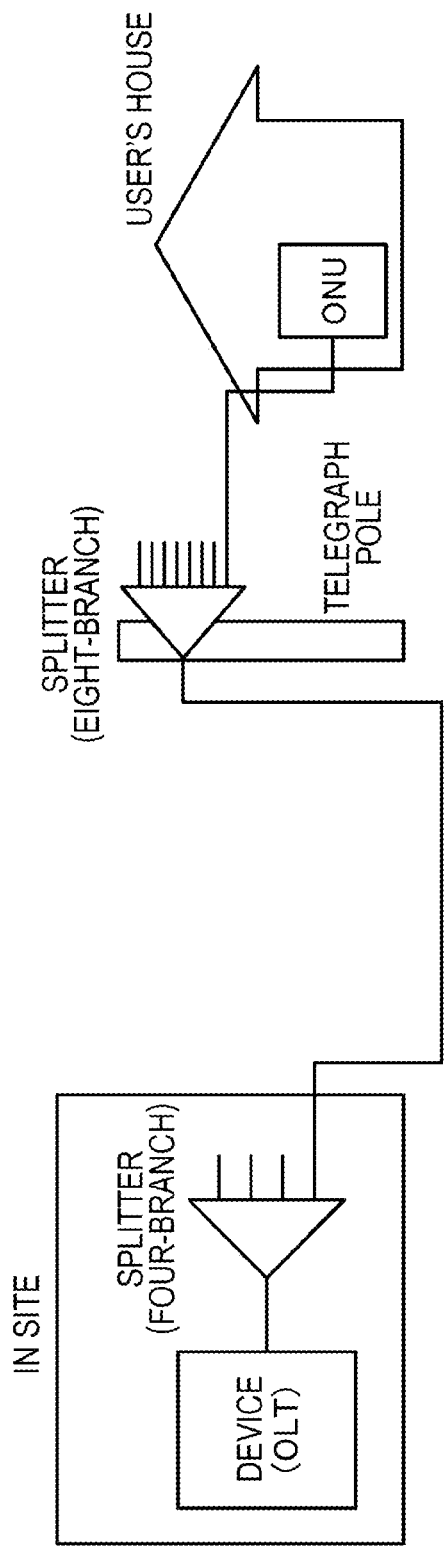
FIG. 2 is a diagram for explaining an outline of the connection equipment.

First, connection equipment that connects an optical line telecommunications carrier side accommodation building to an ONU in the user's house will be described. FIGS. 1 and 2 are diagrams illustrating an outline of the connection equipment.

As illustrated in FIGS. 1 and 2, in the configuration for connecting an accommodation building (inside the site) on the telecommunications carrier side to the user's house, one core wire accommodated in an inside-site device (network device, optical line terminal (OLT)) on the higher side (the office building side of the telecommunications carrier of the optical line) is branched into four core wires (first core wires) using a splitter (4SP (first branch equipment)) in the office building. Outside the site, the core wire is further branched into eight core wires (second core wires) using a splitter (8SP (second branch equipment that branches the first core wire into a plurality of second core wires)). For example, one user is accommodated in one cable branched into eight. That is, 32 users are accommodated in one core wire accommodated in the device on the office building side. A terminal device (ONU) is disposed in a user's house and terminates transmission using light. A device log is stored in the OLT.

Definitions of terms used in the following description will be given. The splitter is a device for separating and merging lines in data communication. In the connection method using the splitter, since the optical fiber of the main line part can be efficiently used by a plurality of persons, equipment efficiency is improved as compared with a method in which the optical fiber is directly connected to the user's house, and construction costs and utilizations cost can be reduced. The 4SP is a four-branch splitter installed in the site. The 8SP is an eight-branch splitter installed outside the site. Normally, in order to connect to the 4SP and the 8SP up to the ONU in the user's house, 32 users share one core wire connected to the inside-site device.

The inside-site is the inside the office building on the telecommunications carrier side in optical communication. The outside-site is outside the office building on the telecommunications carrier side in optical communication. An ONU inside a user's house is also included outside the site. The device log is time-series data divided into time slots at regular time intervals, and includes an alarm issued when a device constituting the connection equipment illustrated in FIG. 1 becomes abnormal.

The main line cable (cable having a plurality of first core wires) is a cable connected to the inside-site device and connected by the 8SP. Normally, approximately 100 to 1000 cores are contained in the main line cable in consideration of utilization efficiency. The wiring cable is a cable connected from the 8SP to the lower part. Normally, approximately 8 to 100 cores are accommodated in the wiring cable. The drop cable is a cable to be drawn into the user's house from a user wiring point, and is also referred to as a draw-in cable.

The upper part indicates the office building side of the optical line telecommunications carrier from the target device. For example, "cable at the upper part of the 8SP" indicates a main line cable from the office building of the telecommunications carrier to the 8SP. The lower part indicates the inside of the user's house from the target device. For example, "cable at the lower part of the 8SP" (equipment that connects the second core wire to the ONU) indicates a wiring cable and a drop cable connected from the 8SP to the user's house. Note that, in the present embodiment, on the assumption of equipment configuration having multiple layers as described above, a technology will be described in which a failed part is identified by identifying a type of the generated alarm and an uppermost (closest to local) element common to equipment generating the alarm. In addition, the present embodiment assumes the above-described configuration, but may be appropriately changed according to the relationship between multiplexing and layers.

Figure 3:
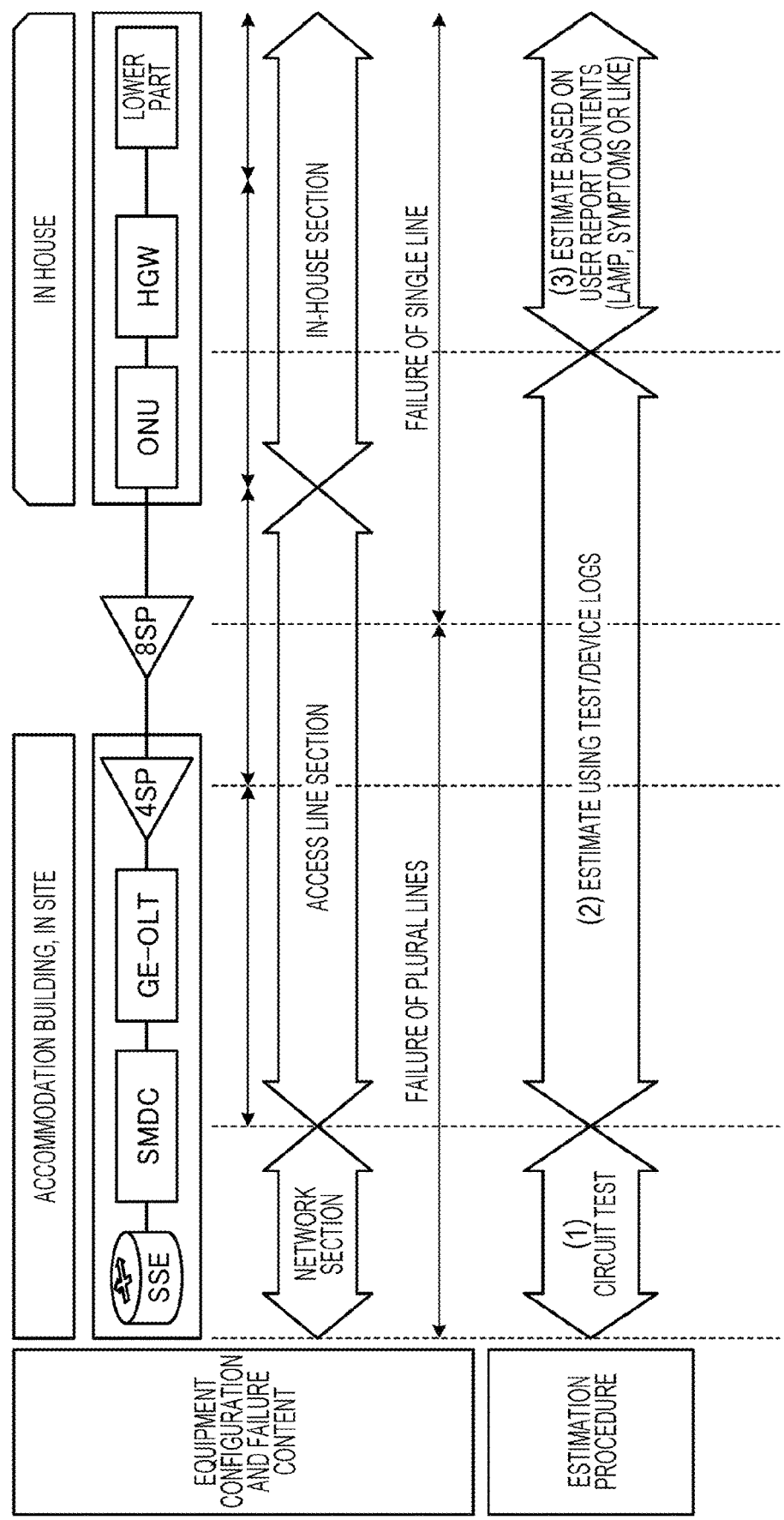
FIG. 3 is a diagram for explaining an equipment configuration and a failure section estimation method.

FIG. 3 is a diagram for explaining the equipment configuration and a failure section estimation method. As illustrated in FIG. 3, it is possible to estimate the occurrence of a failure using a line test ((1) in FIG. 3) for a network section in the site, and to estimate the occurrence of a failure based on the details reported by a user (blinking state of a lamp of an ONU, a symptom, or the like) for a lower part of the ONU in a house section. On the other hand, in the access line section from the network device in the site to the ONU main body in the user's house, it is difficult to determine the failed part, and the accuracy of arrangement for the failure may be low.

In Embodiment 1, the presence or absence of the occurrence of the failure in the access line section is estimated using the device log. In the estimation method according to Embodiment 1, it is determined whether there is an influence on the entire four-branch splitter (4SP) and whether there is an influence on the entire eight-branch splitter (8SP) with regard to a failure affecting a plurality of lines based on the device log for a certain period going back in the past. That is, the determination is made based on not the log of a certain snapshot but, for example, the entire history of logs in a period of one previous month. Here, "there is an influence" may mean that any of the devices arranged on the lower side (the user side) of the splitter issues an alarm. Subsequently, in the estimation method according to Embodiment 1, a case where it is estimated that there has not been an influence on the plurality of lines is regarded as a single line failure, and by isolating the failed part, the presence or absence of occurrence of a failed part in the access line section can be estimated.

[Estimation Device]

Figure 4:
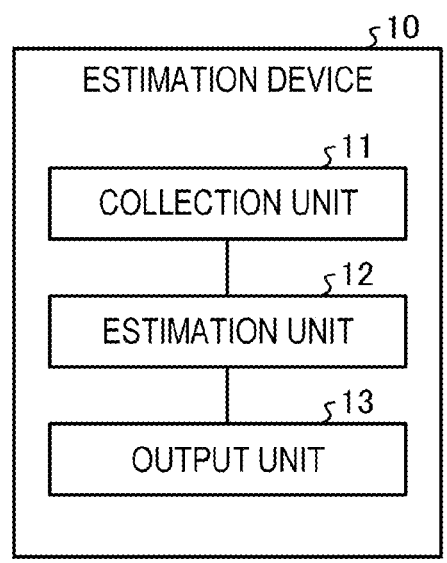
FIG. 4 is a diagram schematically illustrating an example of a configuration of an estimation device according to Embodiment 1.

Next, a description will be given of an estimation device that estimates in which section of connection equipment that connects a building in which telecommunication equipment is accommodated to a user's house a failure has occurred. FIG. 4 is a diagram schematically illustrating an example of a configuration of the estimation device according to Embodiment 1.

The estimation device 10 is implemented by, for example, a predetermined program being read by a computer or the like including a read only memory (ROM), a random access memory (RAM), a central processing unit (CPU), and the like, and the CPU executing the predetermined program. Further, the estimation device 10 includes a communication interface that transmits and receives various types of information to and from another device which is connected in a wired manner or connected via a network or the like. The estimation device 10 includes a collection unit 11, an estimation unit 12, and an output unit 13.

The collection unit 11 collects an alarm issued when a device included in the connection equipment illustrated in FIG. 1 is not in a normal state. Specifically, the collection unit 11 collects alarms by receiving input of device logs (history of alarms) of the OLT in the optical communication equipment.

FIG. 5 is a diagram illustrating an example of items of a device log. As illustrated in FIG. 5, the device log includes, as items, a time stamp (yyyymmdd hh:mm:ss format), a line accommodation position (package number, slot number, and port number), an alarm name, and alarm generation classification (generation/recovery).

The estimation unit 12 estimates in which section of the connection equipment illustrated in FIG. 1 a failure has occurred, based on the type of the collected alarms and the equipment for which the alarm has been issued. Here, as a result of analyzing the history of alarms described in the device logs, it has been found that there is a high correlation between the appearance of the alarm over time and the section in which the failure has occurred (failed part). Therefore, in Embodiment 1, by analyzing a large number (for example, 5000) of device logs, the correspondence relationship between the type of alarm and the equipment for which the alarm has been generated and the failed part is obtained in advance. The estimation unit 12 estimates the failed part by executing a determination logic based on the correspondence relationship between the type of the alarm and the failed part, which is obtained in advance.

The estimation unit 12 confirms whether or not there is an influence on the entire 4SP and whether or not there is an influence on the entire 8SP, as the failure affecting the plurality of lines. Subsequently, in the estimation method according to Embodiment 1, a case where it is estimated that there has not been an influence on the plurality of lines is regarded as a single line failure, and by isolating the failed part, the presence or absence of occurrence of a failed part in the range from the access line section to the ONU can be estimated. The estimation unit 12 determines presence or absence of degradation or service disconnection at the 4SP and presence or absence of degradation or service disconnection at the 8SP for the type of alarm described in the device log and the equipment for which the alarm has been issued. Then, the estimation unit 12 determines presence or absence of the power disconnection of the ONU or presence or absence of prolongation of disconnection period. The estimation unit 12 estimates whether the failed part is in the site, the cable at the upper part of the 8SP, the cable at the lower part of the 8SP, or the ONU main body, according to the determination results of each determination.

Then, the estimation unit 12 may estimate the presence or absence of a possibility of failure at the lower part of the ONU according to the presence or absence of output of logs which are issued from the port corresponding to the ONU which is an estimation target based on the history of alarms of the device logs. Here, the failure is intended to mean that any one of the user's devices connected from the port at the lower part of the ONU to the opposite side of the ONU is not normal, for example, a failure of the ONU or a port connected to the opposite side of the ONU by the user, a connection failure of the cable connected to the ONU, or the like.

The output unit 13 outputs the estimation result obtained by the estimation unit 12. In actual operation, the output unit 13 outputs the estimated failed part from the viewpoint of convenience of the user on the optical line telecommunications carrier side who uses the estimation result. The output unit 13 may output a combination of the failed part and the details of the repair arrangement. In the following processing, a case where a combination of the failed part and the details of details of arrangement is output as an estimation result will be described as an example.

[Processing of Estimation Device]

Figure 6:
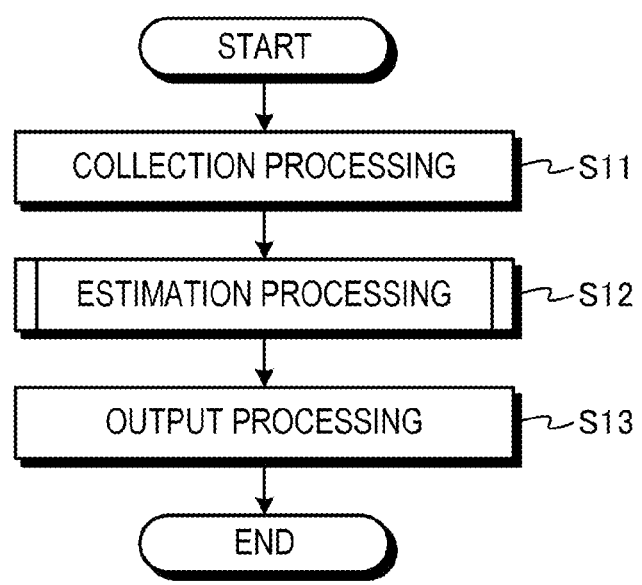
FIG. 6 is a flowchart illustrating a processing procedure of processing executed by an estimation device 10 according to Embodiment 1.

FIG. 6 is a flowchart illustrating a processing procedure of processing executed by the estimation device 10 according to Embodiment 1.

In the estimation device 10, the collection unit 11 collects alarms by inputting the device logs of the connection equipment illustrated in FIG. 1 (step S11). The estimation unit 12 performs estimation processing of estimating a failed part of the connection equipment illustrated in FIG. 1 based on the device logs (step S12). The output unit 13 performs output processing of outputting the estimation result by the estimation unit 12 (step S13).

[Processing Procedure of Estimation Processing]

Next, a processing procedure of the estimation processing (step S13) illustrated in FIG. 6 will be described. FIGS. 7, 9, 11, and 13 are flowcharts illustrating processing procedures of the estimation processing illustrated in FIG. 6.

First, the estimation unit 12 refers to the device logs and determines the presence or absence of a plurality of wiring failures. The estimation unit 12 determines whether or not service disconnection is occurring at the entire 8SP (step S21 in FIG. 7). FIG. 8 is a diagram for explaining the determination conditions in the determination processing illustrated in FIG. 7. As illustrated in FIG. 8, in step S21 of FIG. 7, the estimation unit 12 determines whether or not service disconnection at the same time occurring at two or more ports including the corresponding port among the eight ports (within 5 seconds before and after) is still occurring. Specifically, the estimation unit 12 determines whether or not service disconnection that continues to this moment is occurring at two or more ports out of eight ports in the vicinity of the host port, and whether or not there is a case where the absolute value of the difference is within 5 seconds when combining the service disconnection times two by two.

Figure 7:
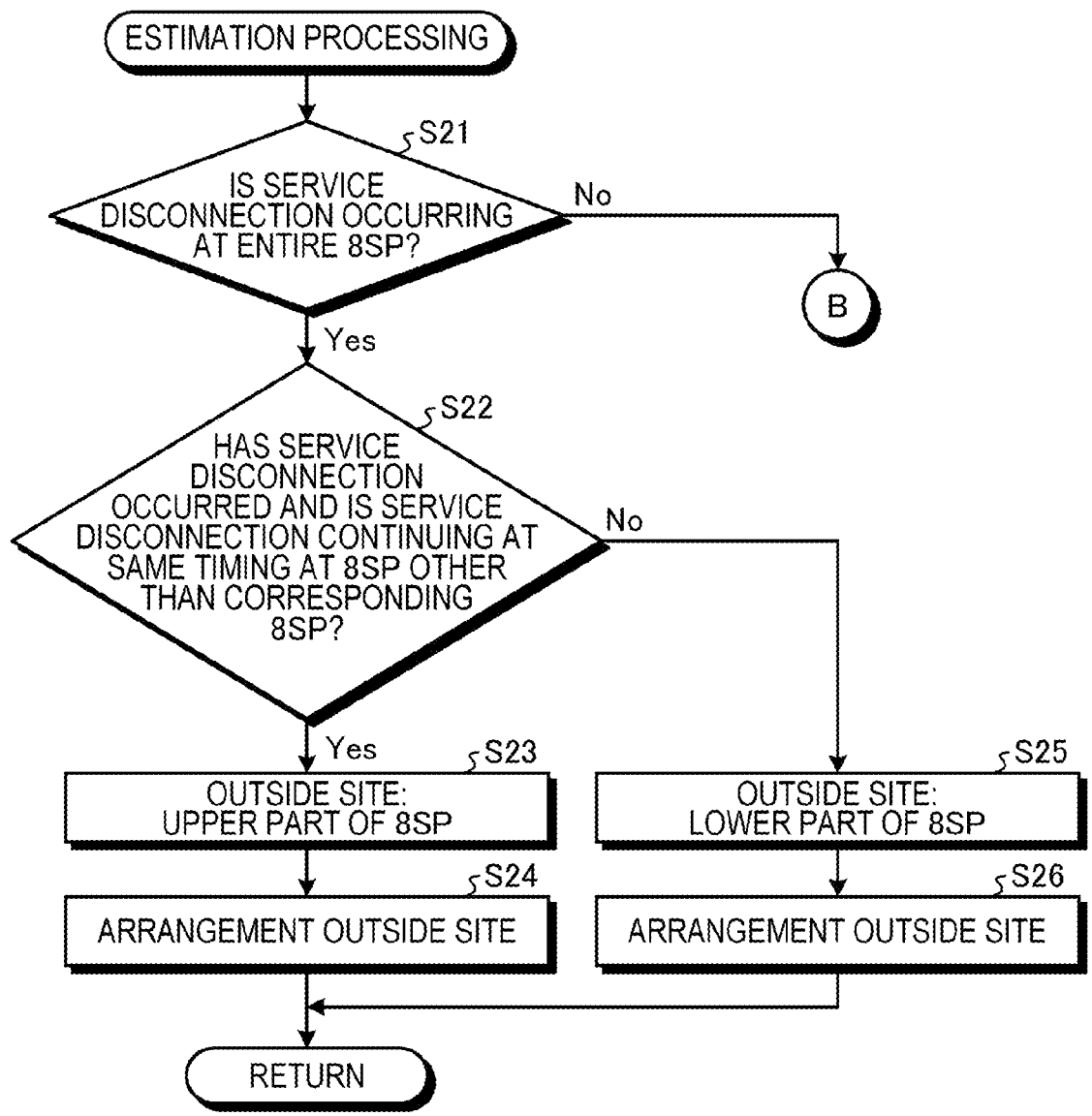
FIG. 7 is a flowchart illustrating a processing procedure of estimation processing illustrated in FIG. 6.

When the service disconnection is occurring at the entire 8SP (step S21 in FIG. 7: Yes), the estimation unit 12 determines whether or not the service disconnection has occurred and is continuing at the same timing at an 8SP other than the corresponding 8SP (step S22 in FIG. 7). The "corresponding 8SP" is the 8SP to which the host line is connected among the four 8SPs. As illustrated in FIG. 8, in step S22 of FIG. 7, the estimation unit 12 determines whether or not there are service disconnections occurring within 5 seconds before and after the time of the service disconnection occurring in step S21 of FIG. 7 in slot ports (for example, 24 ports for company A, and 512−8=504 ports for company B) other than the vicinity of the host port, and whether or not the service disconnections are continuing to this moment.

When the service disconnection has occurred and is continuing at the same timing at an 8SP other than the corresponding 8SP (step S22 in FIG. 7: Yes), the estimation unit 12 estimates that there is a failure outside the site (at the upper part of the 8SP) (step S23 in FIG. 7), and determines that the details of details of arrangement is an arrangement outside the site (step S24 in FIG. 7). When the service disconnection has not occurred and is not continuing at the same timing at an 8SP other than the corresponding 8SP (step S22 in FIG. 7: No), the estimation unit 12 estimates that there is a failure outside the site (lower part of the 8SP) (step S25 in FIG. 7), and determines that the details of details of arrangement is an arrangement outside the site (step S26 in FIG. 7).

When the service disconnection is not occurring at the entire 8SP (step S21 in FIG. 7: No), the estimation unit 12 determines whether or not the uplink degradation frequently occurs at the entire 4SP (step S31 in FIG. 9). FIG. 10 is a diagram for explaining the determination conditions in the determination processing illustrated in FIG. 9. As illustrated in FIG. 10, in step S31 of FIG. 9, the estimation unit 12 determines whether or not uplink error degradation has occurred one or more times at five or more ports out of 32 ports subordinate to the 4SP in three days. Numerical values used as threshold values, such as five or more ports, three days, one or more times, and five seconds, are designed based on statistical values of a site to be implemented, prior knowledge, and the like.

Figure 9:
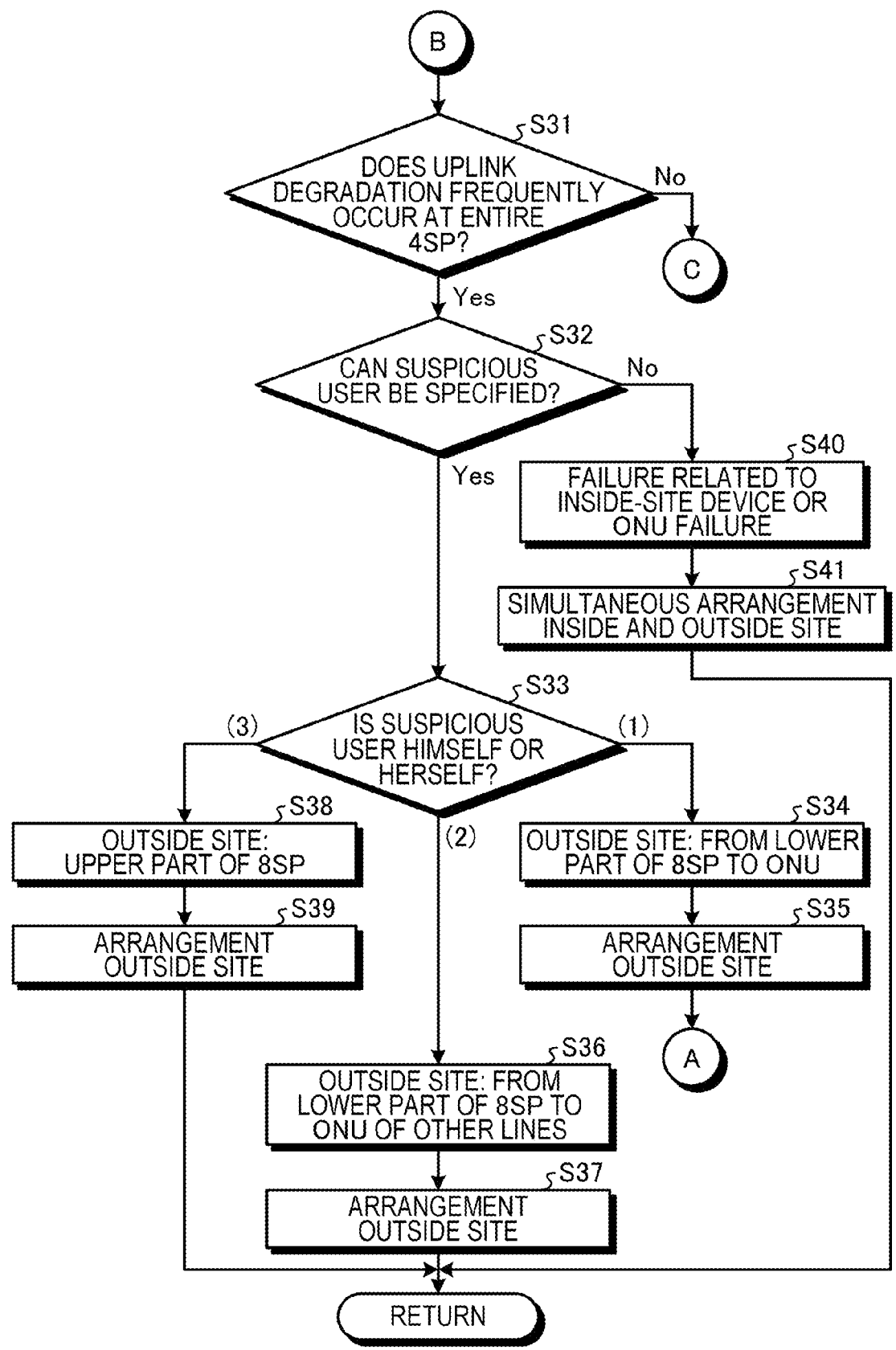
FIG. 9 is a flowchart illustrating a processing procedure of the estimation processing illustrated in FIG. 6.

When the uplink degradation frequently occurs at the entire 4SP (step S31 in FIG. 9: Yes), the estimation unit 12 determines whether or not the suspicious user can be identified (step S32 in FIG. 9). The "suspicious user" is a cause line that affects the failure of the entire 8SP. In step S32 of FIG. 9, the estimation unit 12 determines whether or not there is a user whose suspicion flag is "1".

When the suspicious user can be identified (step S32 in FIG. 9: Yes), the estimation unit 12 determines whether or not the suspicious user is himself or herself (step S33 in FIG. 9). In addition, the user himself or herself is the "host line" (of the contract in which the failure report is made). In step S33 of FIG. 9, the estimation unit 12 determines whether (1) the suspicion flag is set to less than two ports in 8SP and the user himself or herself is suspicious, (2) the suspicion flag is set to less than two ports in 8SP and the user himself or herself is not suspicious, or (3) the suspicion flag is set to three ports or more in 8SP.

When the determination result in step S33 is (1) (step S33 in FIG. 9: (1)), the estimation unit 12 estimates that there is a failure outside the site (from the lower part of the 8SP to the ONU) (step S34 in FIG. 9), and determines that the details of arrangement is an arrangement outside the site (step S35 in FIG. 9). When the determination result in step S33 of FIG. 9 is (2) (step S33 in FIG. 9: (2)), the estimation unit 12 estimates that there is a failure outside the site (from the lower part of the 8SP to the ONU of other lines) (step S36 in FIG. 9), and determines that the details of arrangement is an arrangement outside the site (step S37 in FIG. 9). When the determination result in step S33 is (3) (step S33 in FIG. 9: (3)), the estimation unit 12 estimates that there is a failure outside the site (at the upper part of the 8SP) (step S38 in FIG. 9), and determines that the details of arrangement is an arrangement outside the site (step S39 in FIG. 9).

When the suspicious user cannot be specified (step S32 in FIG. 9: No), the estimation unit 12 estimates that there is a failure related to the inside-site device or there is an ONU failure (step S40 in FIG. 9), and determines that the details of arrangement is the simultaneous arrangement inside and outside the site (step S41 in FIG. 9).

When the uplink degradation does not frequently occur at the entire 4SP (step S31 in FIG. 9: No), the estimation unit 12 determines whether or not the downlink degradation or service disconnection frequently occurs at the entire 4SP (step S51 in FIG. 11). FIG. 12 is a diagram for explaining the determination conditions in the determination processing illustrated in FIG. 11. As illustrated in FIG. 8, in step S51 in FIG. 11, the estimation unit 12 determines whether or not downlink error degradation or service disconnection has occurred four or more times (sum of two types) at five or more ports out of 32 ports subordinate to the 4SP in three days.

Figure 11:
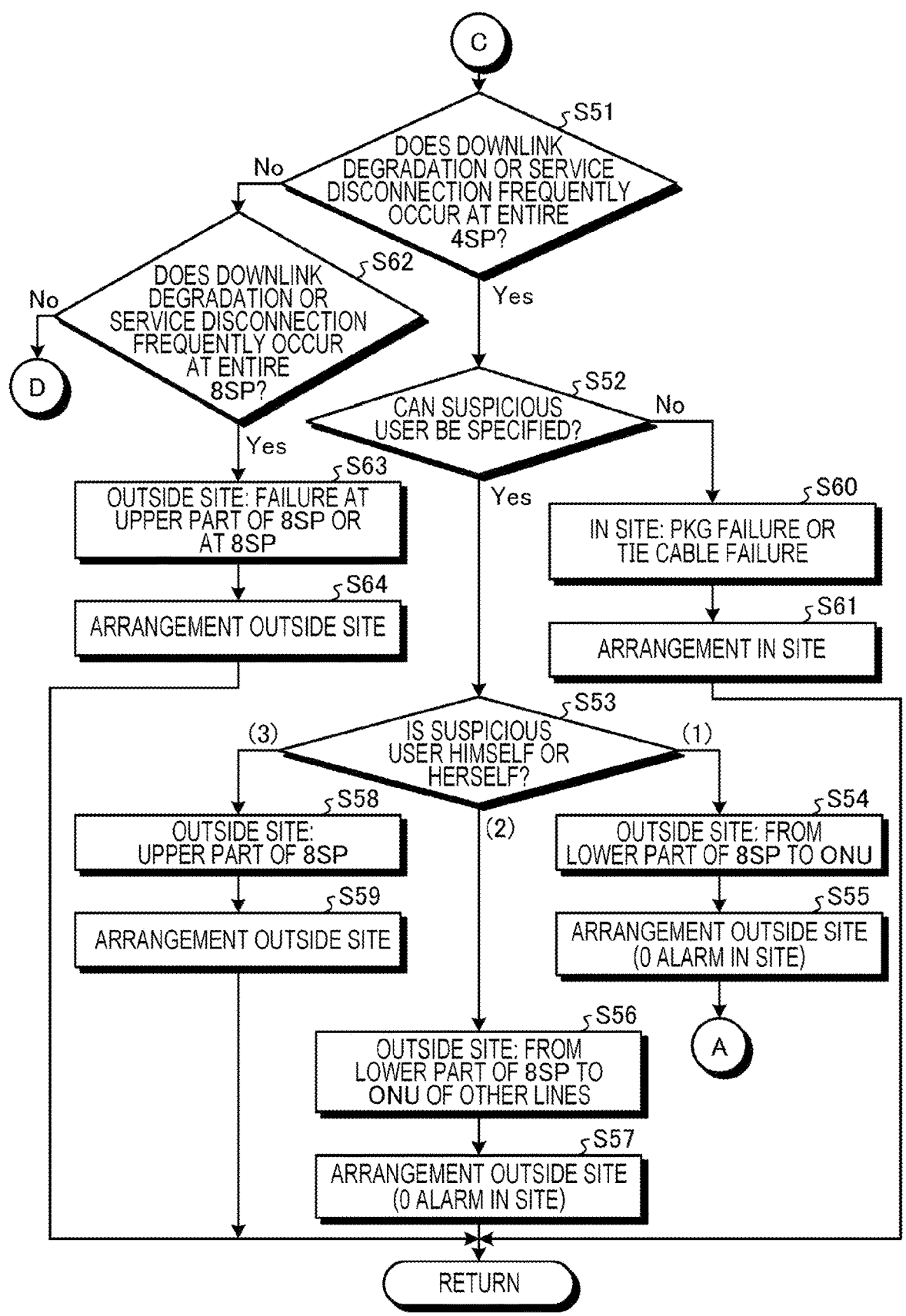
FIG. 11 is a flowchart illustrating a processing procedure of the estimation processing illustrated in FIG. 6.

When the downlink degradation or service disconnection frequently occurs at the entire 4SP (step S51 in FIG. 11: Yes), the estimation unit 12 determines whether or not the suspicious user can be specified (step S52 in FIG. 11). Actual equipment does not break cleanly, and an error may occur or service disconnection may occur intermittently. This can occur not only in the ONU or not only in the OLT or SP unit but also in the subordinate equipment unit accommodated in the OLT or the SP. That is, even when a certain equipment fails, the equipment accommodated in the equipment may not issue alarms at the same time. Therefore, in step S52, it is determined whether or not a failure has occurred in the line according to the number and type of alarms that have occurred within a predetermined time for each line. The determination can be appropriately set, and for example, occurrence of downlink error degradation, occurrence of uplink error degradation, occurrence of service disconnection, and the like may be used as types. In order not to detect the power disconnection of the ONU disposed at the user's house as a failure, the number of times of ONU power disconnection may be subtracted from the number of times of occurrence of service disconnection. In step S52 of FIG. 11, similar to step S32 of FIG. 9, the estimation unit 12 determines whether or not there is a user whose suspicion flag is "1".

When the suspicious user can be specified (step S51 in FIG. 11: Yes), it is determined whether or not the suspicious user is himself or herself (step S53 in FIG. 11). In step S53 of FIG. 11, similar to step S33 of FIG. 9, the estimation unit 12 determines whether (1) the suspicion flag is set to less than two ports in 8SP and the user himself or herself is suspicious, (2) the suspicion flag is set to less than two ports in 8SP and the user himself or herself is not suspicious, or (3) the suspicion flag is set to three ports or more in 8SP.

When the determination result in step S53 is (1) (step S53 in FIG. 11: (1)), the estimation unit 12 estimates that there is a failure outside the site (from the lower part of the 8SP to the ONU) (step S54 in FIG. 11), and determines that the details of arrangement is an arrangement outside the site (0 alarm in the site) (step S55 in FIG. 11). When the determination result in step S53 is (2) (step S53 in FIG. 11: (2)), the estimation unit 12 estimates that there is a failure outside the site (from the lower part of the 8SP to the ONU of other lines) (step S56 in FIG. 11), and determines that the details of arrangement is an arrangement outside the site (0 alarm in the site) (step S57 in FIG. 11). When the determination result in step S53 is (3) (step S53 in FIG. 11: (3)), the estimation unit 12 estimates that there is a failure outside the site (at the upper part of the 8SP) (step S58 in FIG. 11), and determines that the details of arrangement is an arrangement outside the site (step S59 in FIG. 11).

When the suspicious user cannot be specified (step S52 in FIG. 11: No), the estimation unit 12 estimates that there is a failure outside the site (PKG failure or TIE cable failure) (step S60 in FIG. 11), and determines that the details of arrangement is the arrangement inside the site (step S61 in FIG. 11).

When the downlink degradation and service disconnection does not frequently occur at the entire 4SP (step S51 in FIG. 11: No), the estimation unit 12 determines whether or not the downlink degradation or service disconnection frequently occurs at the entire 8SP (step S62 in FIG. 11). In step S62 of FIG. 11, the estimation unit 12 determines whether or not downlink error degradation or service disconnection has occurred at two or more ports out of the eight ports of the line four or more times in three days.

When the downlink degradation or service disconnection frequently occurs at the entire 8SP (step S62 in FIG. 11: Yes), the estimation unit 12 estimates that there is a failure outside the site (failure at the upper part of the 8SP or at the 8SP) (step S63 in FIG. 11), and determines that the details of arrangement is arrangement outside the site (step S64 in FIG. 11).

A case where the downlink degradation and service disconnection do not frequently occur at the entire 8SP (step S62: No in FIG. 11) will be described. In this case, since the suspicious part is other than 4SP and 8SP, the lower part of the ONU (that is, the in-house failure) is suspected as the suspicious part. That is, since it is estimated that there has not been an influence on the plurality of lines, this is regarded as a single line failure, and the following processing is performed by isolating the failed part. Specifically, the estimation unit 12 determines whether or not ONU power disconnection frequently occurs (step S71 in FIG. 13). FIG. 14 is a diagram for explaining the determination conditions in the determination processing illustrated in FIG. 13. As illustrated in FIG. 14, in step S71 in FIG. 13, the estimation unit 12 determines whether or not ONU power disconnection has occurred at its own port four or more times in 31 days.

Figure 13:
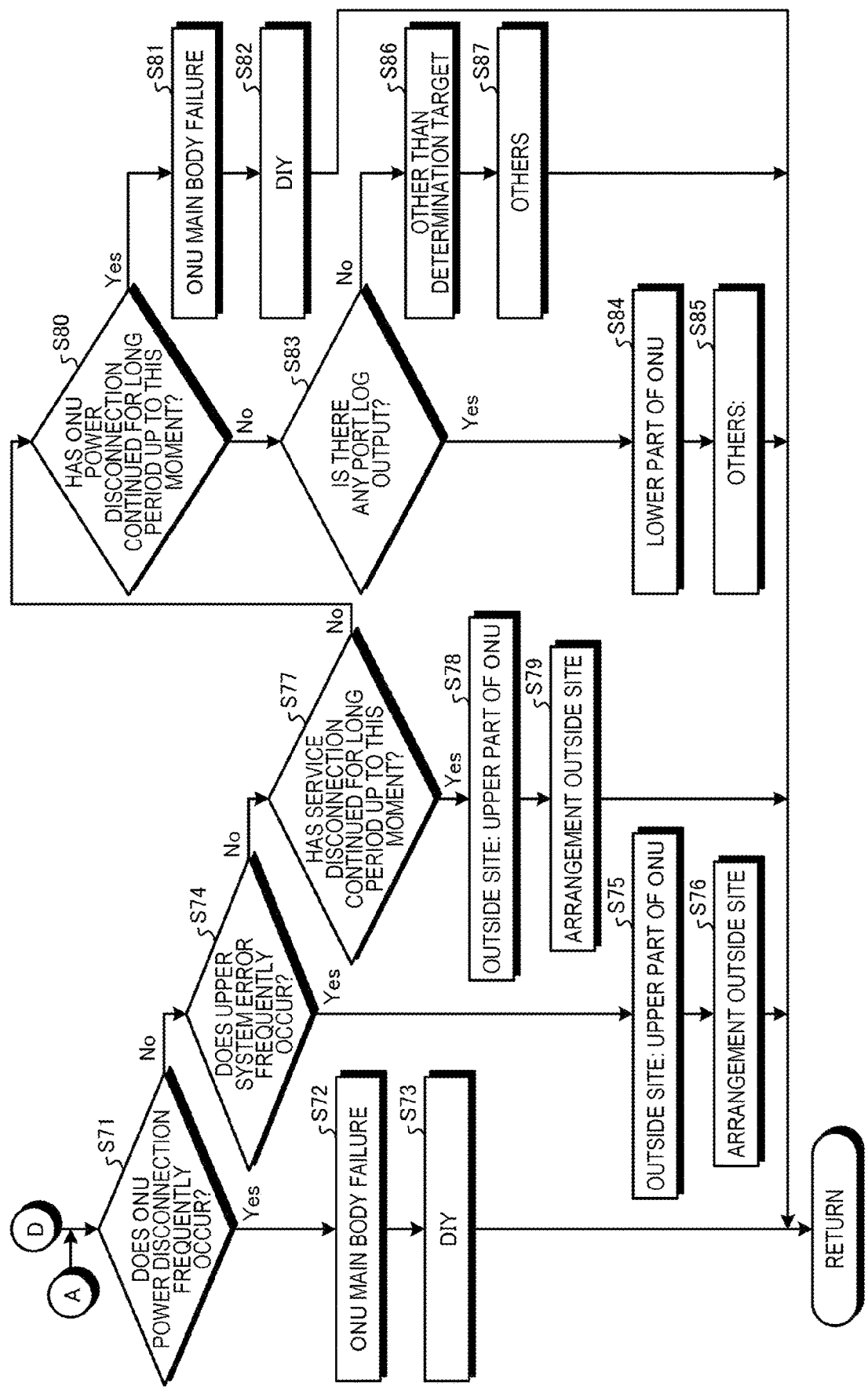
FIG. 13 is a flowchart illustrating a processing procedure of the estimation processing illustrated in FIG. 6.

When ONU power disconnection frequently occurs (step S71 in FIG. 13: Yes), the estimation unit 12 estimates that the ONU main body has failed (step S72 in FIG. 13), and determines that the details of arrangement is the DIY arrangement (step S73 in FIG. 13). The DIY arrangement is, for example, delivery of a repair member for repair by the user himself or herself.

When ONU power disconnection does not frequently occur (step S71: NO in FIG. 13), the estimation unit 12 determines whether or not an upper system error frequently occurs (step S74 in FIG. 13). The "upper system error" is service disconnection, uplink error degradation, and downlink error degradation. In step S74 of FIG. 13, the estimation unit 12 determines whether or not the service disconnection, uplink error degradation, or downlink error degradation has occurred four or more times (sum of three types of appearance times) in three days at its own port.

When uplink error system frequently occurs (step S74 in FIG. 13: Yes), the estimation unit 12 estimates that the ONU upper part has failed (step S75 in FIG. 13), and determines that the details of arrangement is the arrangement outside the site (step S76 in FIG. 13).

When the upper system errors do not frequently occur (step S74 in FIG. 13: No), the estimation unit 12 determines whether or not service disconnection has continued for a long period up to this moment (step S77 in FIG. 13). In step S77 of FIG. 13, the estimation unit 12 determines whether or not there is an event in which the service disconnection continues for 30 minutes or more at its own port within ten days. However, in the case of a product by a specific manufacturer, service disconnection due to ONU power disconnection is excluded.

When the service disconnection has continued for a long period up to this moment (step S77 in FIG. 13: Yes), the estimation unit 12 estimates that the ONU upper part has failed (step S78 in FIG. 13), and determines that the details of arrangement is the arrangement outside the site (step S79 in FIG. 13).

When the service disconnection has not continued for a long period up to this moment (step S77 in FIG. 13: No), the estimation unit 12 determines whether or not ONU power disconnection has continued for a long period up to this moment (step S80 in FIG. 13). In step S80 of FIG. 13, the estimation unit 12 determines whether or not ONU power disconnection occurred 30 minutes or more before at its own port and there is no log of ONU disconnection recovery up to this moment.

When ONU power disconnection has continued for a long period up to this moment (step S80 in FIG. 13: Yes), the estimation unit 12 estimates that the ONU main body has failed (step S81 in FIG. 13), and determines that the details of arrangement is the DIY arrangement (step S82 in FIG. 13).

When the ONU power disconnection has not continued for a long time up to this moment (step S80 in FIG. 13: No), the estimation unit 12 determines whether or not a log of the port has been output (step S83 in FIG. 13). In step S83 of FIG. 13, the estimation unit 12 determines whether or not at least one log has been output within most recent 31 days at its own port.

When even one log of the port has been output (step S83 in FIG. 13: Yes), the estimation unit 12 estimates that ONU lower part has failed (step S84 in FIG. 13), and determines that the details of arrangement is another content (step S85 in FIG. 13).

When the log of the port has not been output (step S83 in FIG. 13: No), the estimation unit 12 estimates that this is other than the determination target (step S86 in FIG. 13), and determines that the details of arrangement is another content (step S87 in FIG. 13).

Effects of Embodiment 1

Conventionally, an operator accepts a communication failure and arranges repair or DIY by inquiry and test. In this case, although a lead time is required for reception, there is a problem that determination accuracy of arrangement is low.

On the other hand, in Embodiment 1, the correspondence relationship between the type of alarm and the equipment for which the alarm has been issued and the failed part described above is obtained in advance, and the determination logic based on the correspondence relationship is established. In Embodiment 1, this determination logic makes it possible to estimate in which section of connection equipment that connects a building in which telecommunication equipment is accommodated to a user's house a failure has occurred. In Embodiment 1, by executing this determination logic, it is possible to accurately determine the failed part and the details of arrangement in a short time. Note that the processing and the details of determination in FIGS. 7 to 14 should be appropriately redesigned according to the location to which Embodiment 1 is to be applied and the equipment used. This is because the distance depends on the distance between each device and the office building, the resolution of the network management system (NMS) being used, the time until the device itself issues an alarm, the upper limit of the number of times of repetition, and the like.

Further, in Embodiment 1, by estimating a failed part by isolating the failed part according to the granularity of the inside the site, the upper part of the 8SP, the lower part of the 8SP, and the ONU main body, it is possible to appropriately arrange a repair group and a repair material corresponding to the failed part. Therefore, according to Embodiment 1, it is possible to reduce an opportunity loss of DIY, reduce an arrangement error, and reduce a response time on site. According to Embodiment 1, since the arrangement of the repair group and the repair material can be automated, the reception cost and the lead time can be reduced, and the cost of the repair work can be reduced.

Embodiment 2

Figure 15:
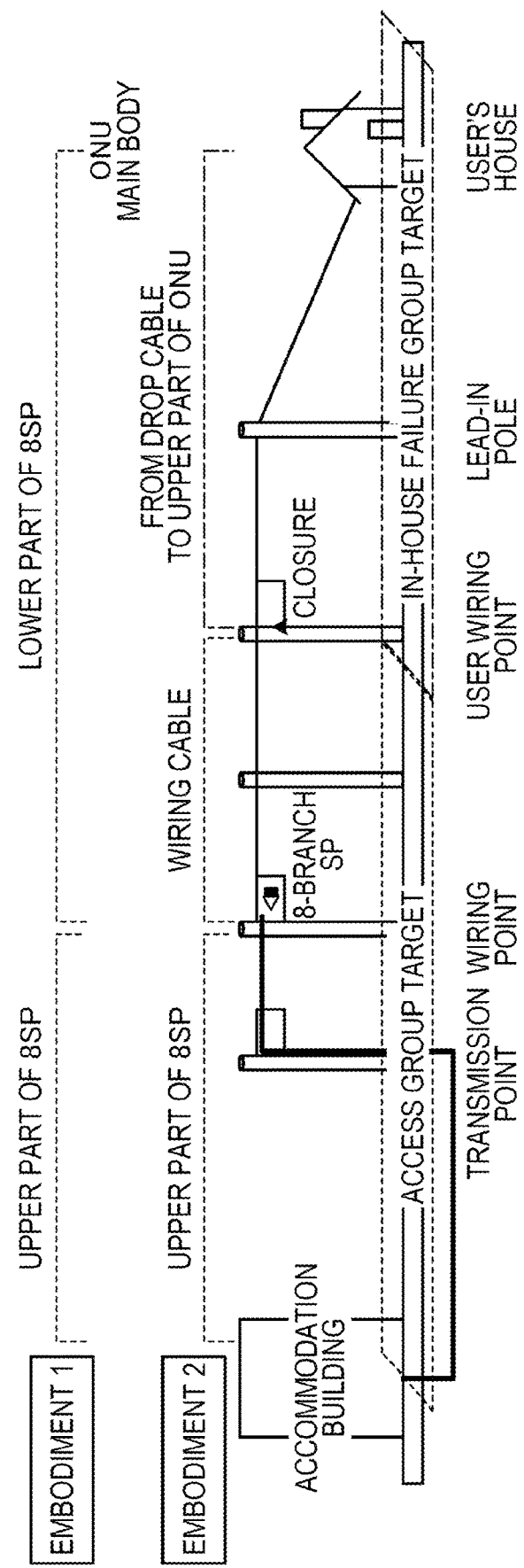
FIG. 15 is a diagram for explaining an outline of the connection equipment.

Next, Embodiment 2 will be described. FIG. 15 is a diagram for explaining an outline of the connection equipment. As illustrated in FIG. 15, the failure arrangement is performed by dividing the lower part of the 8SP into the wiring cable in which the access group is an arrangement target and the drop cable to the upper part of the ONU in which in-house failure group is an arrangement target. In Embodiment 1, based on the details of the history of alarms of the device log, the failed part is estimated with granularity of the inside of the site, the upper part of the 8SP, the lower part of the 8SP, the ONU main body, and others. In Embodiment 2, it is possible to estimate whether the wiring cable has failed or the drop cable has failed at the lower part of the 8SP.

In Embodiment 2, description will be made on the assumption of (A) to (C).

(A) A commercially available cable testing machine displays the details of an alarm that has been issued, but truncates the time stamp.

(B) The wiring cable includes a large number of (for example, approximately 8 to 100) core wires, and the drop cable includes only one core wire.

(C) When the wiring cable fails, an alarm is issued almost at the same time (within a time of approximately one second) in a plurality of the included core wires.

FIGS. 16 and 17 are diagrams illustrating examples of device logs. As a result of verifying the past device logs in the cases (A) to (C), at the time of wiring cable disconnection, service disconnection occurs in a plurality of lines almost at the same time (within a time of approximately one second) (within the same slot) (FIG. 16). In addition, when the drop cable is disconnected, only a single line in which the drop cable is actually disconnected has failed in the slot (FIG. 17).

Therefore, in Embodiment 2, when there are a plurality of core wires issuing the same type of alarm in the same slot (refer to the inside of the frame in FIG. 16), it is estimated that there is a failure in the wiring cable, and when there is no failure (refer to the inside of the frame in FIG. 17), it is estimated that there is a failure from the drop cable to the user's house (from the drop cable to the upper part of the ONU). Note that the estimation device according to Embodiment 2 has a configuration similar to that of the estimation device according to Embodiment 1. The estimation device according to Embodiment 2 performs the same processing as the estimation device according to Embodiment 1 except for a part of step S13 (estimation processing) illustrated in FIG. 6. Therefore, estimation processing in Embodiment 2 will be described.

[Processing Procedure of Estimation Processing]

Figure 18:
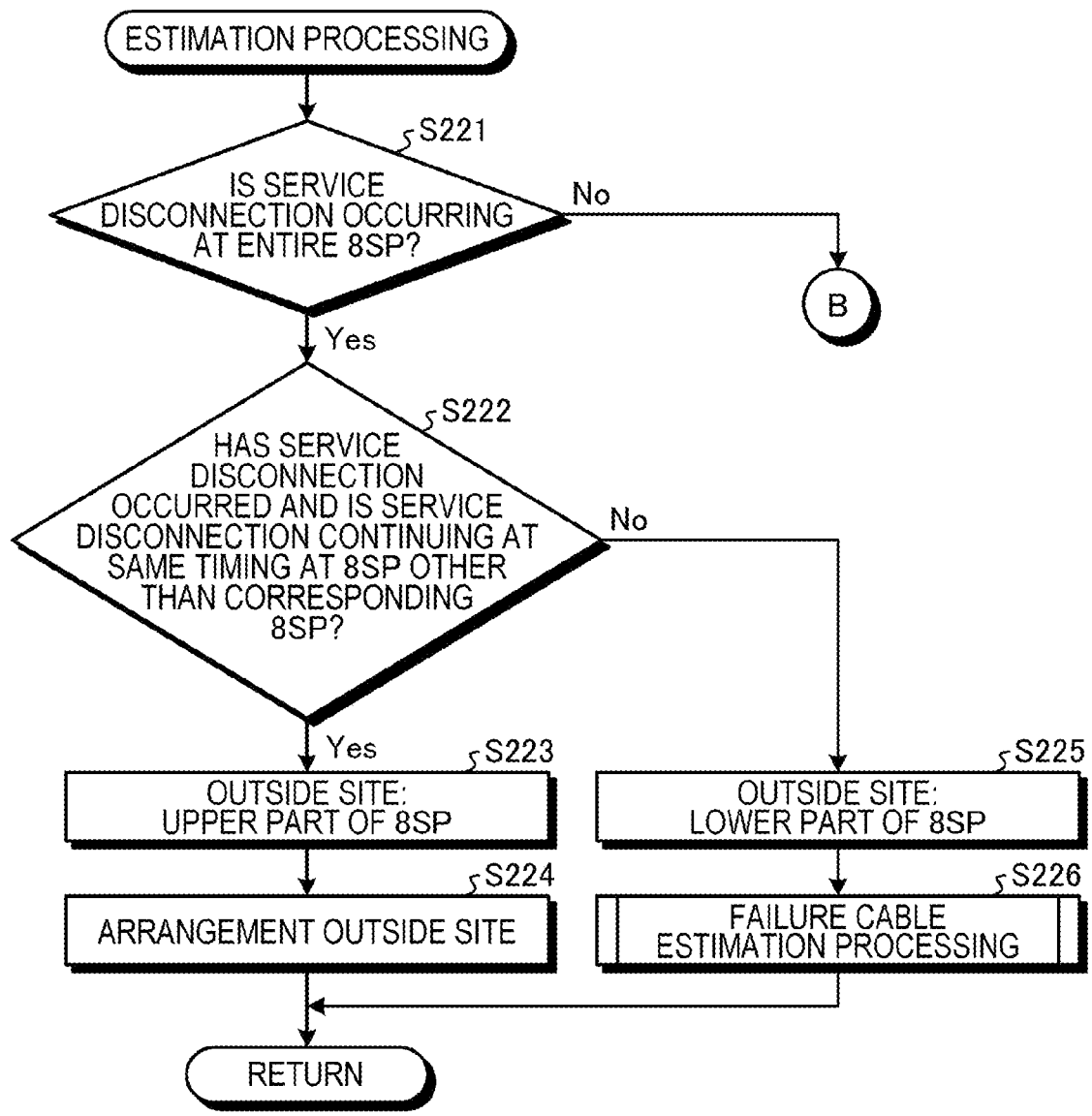
FIG. 18 is a flowchart illustrating a processing procedure of estimation processing according to Embodiment 2.

FIG. 18 is a diagram illustrating a processing procedure of estimation processing in Embodiment 2. Steps S21 to S25 illustrated in FIG. 7 are the same processing as steps S221 to S225 illustrated in FIG. 18. The estimation unit 12 performs failure cable estimation processing of estimating which cable at the lower part of the 8SP is a failed part (step S226). In addition, the processing after the case where the service disconnection is not occurring at the entire 8SP (step S221: No) is the same as the processing after step S31 of the estimation processing in Embodiment 1.

[Failure Cable Estimation Processing]

Figure 19:
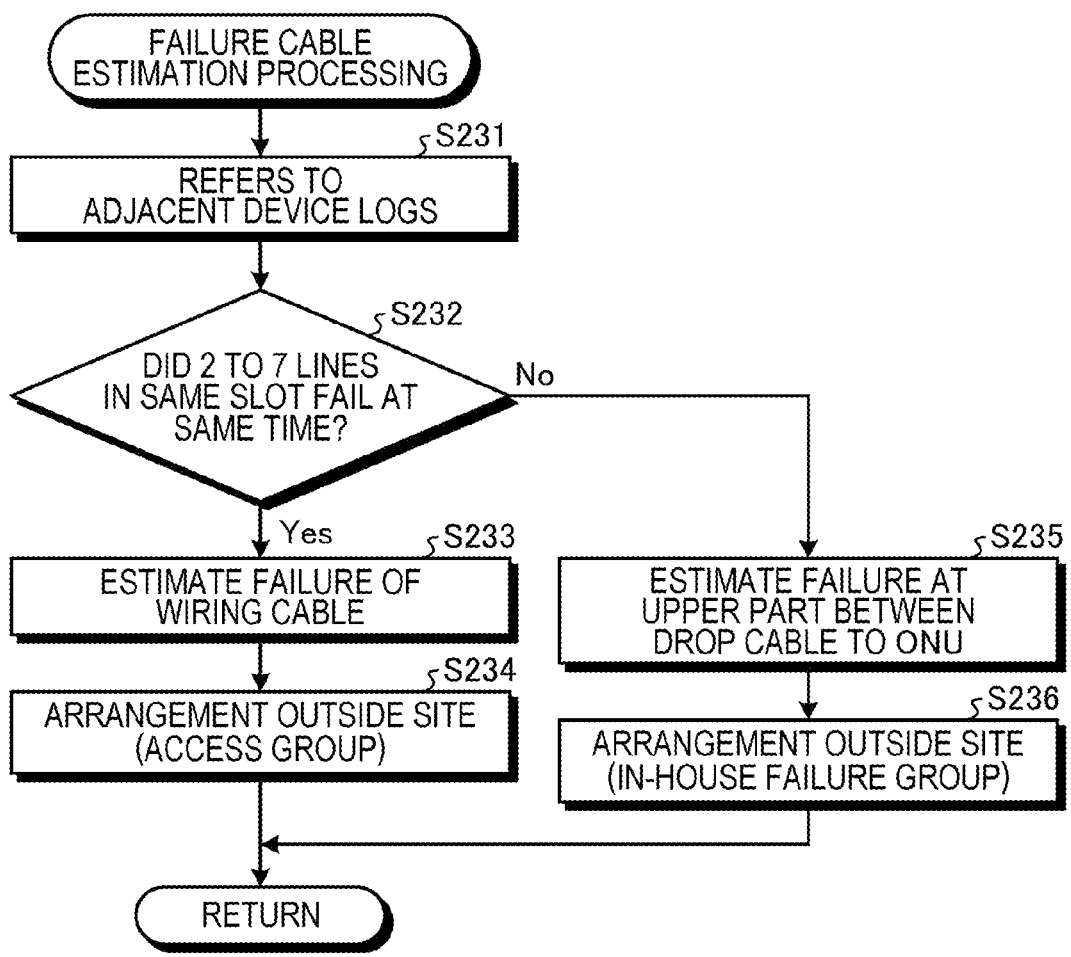
FIG. 19 is a flowchart illustrating a processing procedure of failure cable estimation processing illustrated in FIG. 18.

The failure cable estimation processing (step S226) illustrated in FIG. 18 will be described. FIG. 19 is a flowchart illustrating a processing procedure of the failure cable estimation processing illustrated in FIG. 18.

As illustrated in FIG. 19, the estimation unit 12 refers to the device logs for the adjacent lines (step S231), and determines whether or not 2 to 7 lines in the same slot fail at the same time (step S232).

When 2 to 7 lines in the same slot have a simultaneous failure (step S232: Yes), the estimation unit 12 estimates that the wiring cable has a failure (step S233), and determines that the details of arrangement is an arrangement outside the site (access group) (step S234).

A case where 2 to 7 lines in the same slot do not fail at the same time (step S232: No), that is, a case where only a single line fails will be described. In this case, the estimation unit 12 estimates that there is a failure between the drop cable in the line in which the failure has occurred among the drop cables and the ONU, that is, between the drop cable in which the failure has occurred and the upper part of the ONU (step S235), and determines that the details of arrangement is an arrangement outside the site (in-house failure group) (step S236).

Effects of Embodiment 2

As described above, according to Embodiment 2, it is possible to estimate a failed part with the granularity of the inside of the site, the upper part of the 8SP (from the inside the site to the main line cable), the lower part of the 8SP (wiring cable), the lower part of the 8SP (from the drop cable to the upper part of ONU), and the ONU main body.

Embodiment 3

Next, Embodiment 3 will be described. In Embodiment 3, a failed part is estimated using an estimation model in which a correspondence relationship between appearance patterns of past alarms and a section in which a past failure has occurred is learned in advance.

Figure 20:
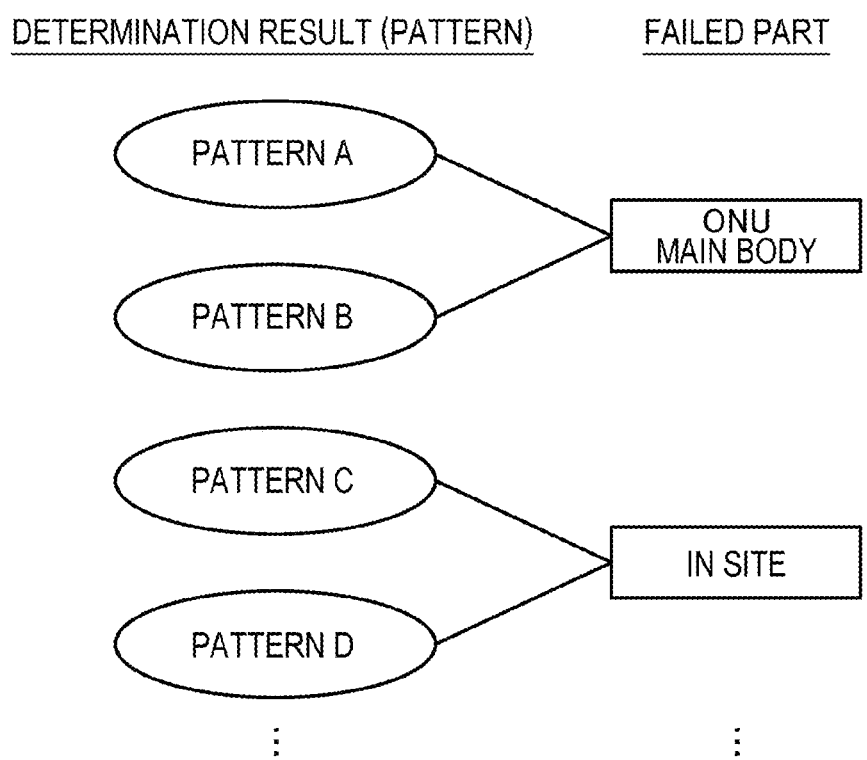
FIG. 20 is a diagram illustrating a correspondence relationship between appearance patterns of alarms and failed parts.

FIG. 20 is a diagram illustrating the correspondence relationship between the appearance patterns of alarms and the failed parts. The alarm appearance pattern of the device logs is a set of analyzable feature quantities extracted from the device log which is time-series data.

As illustrated in FIG. 20, it is known that the appearance pattern of the alarms in the device log and the failed part have a high correlation, and the type of the appearance pattern of the alarms and the actual failed part have a correlation of many to one. In Embodiment 3, the correspondence relationship between the type of the appearance pattern of the alarms and the failed part is obtained in advance before actual operation, and the correspondence relationship between the type of the appearance pattern of the alarms and the failed part is learned by the estimation model using, for example, machine learning. Then, during actual operation, the failed part of the connection equipment illustrated in FIG. 1 is estimated using the learned estimation model.

[Learning Device]

Figure 21:
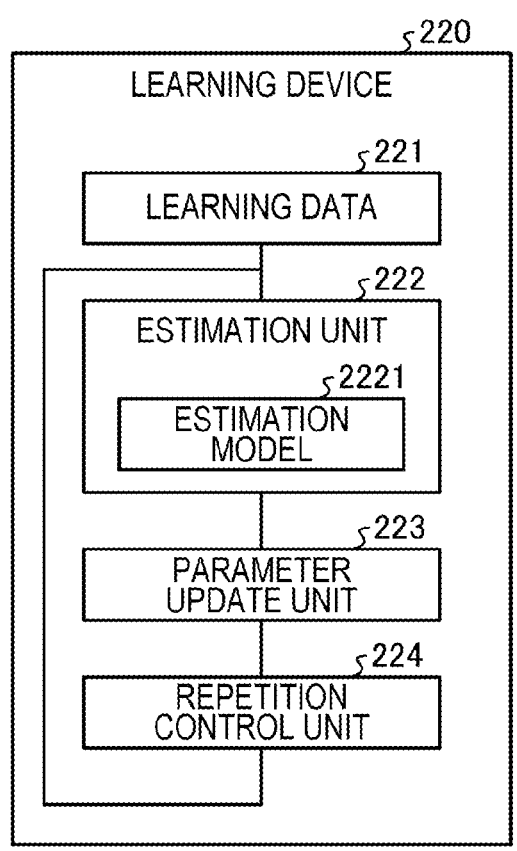
FIG. 21 is a diagram schematically illustrating an example of a configuration of a learning device according to Embodiment 3.
Figure 22:
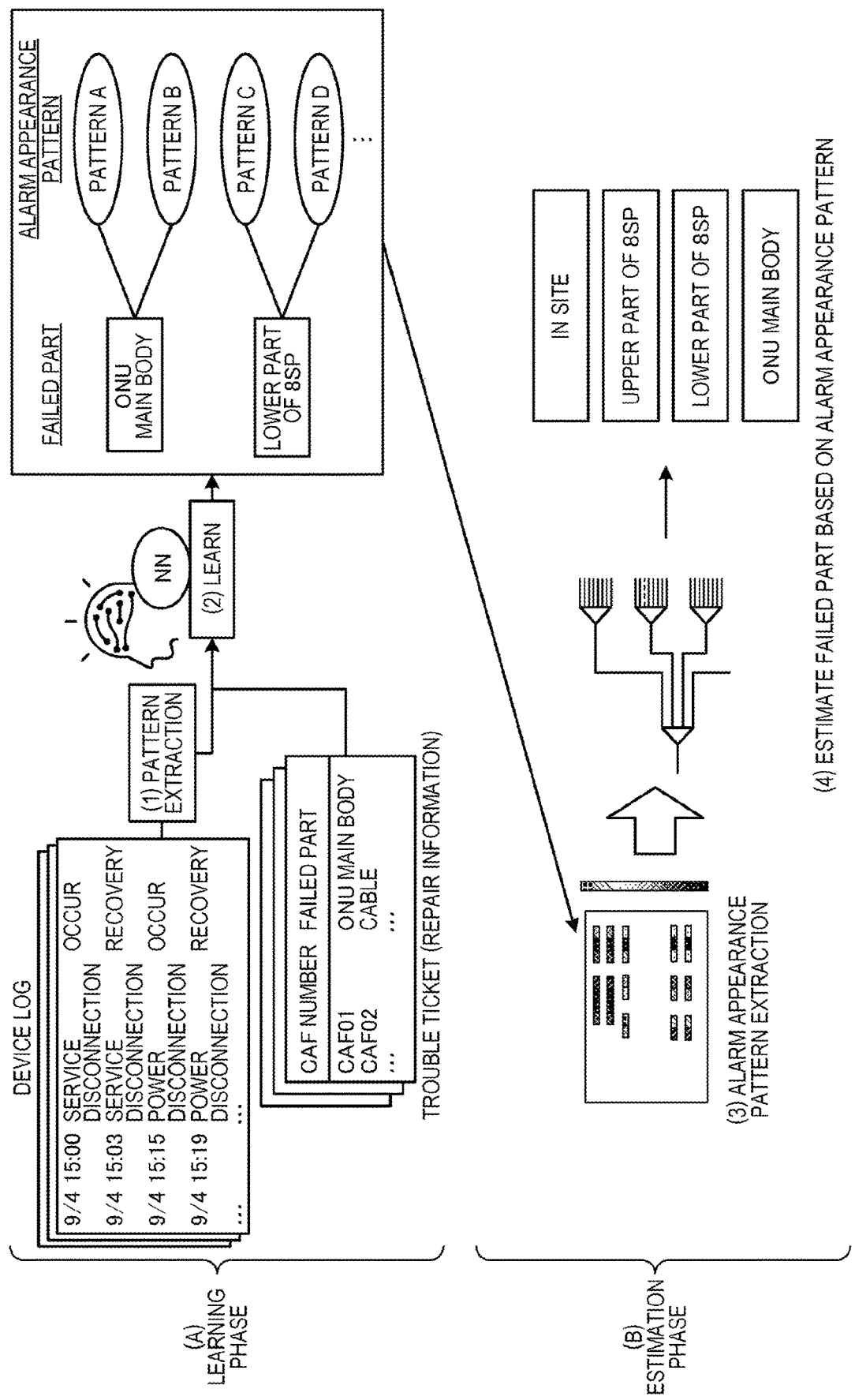
FIG. 22 is a diagram for explaining a flow of learning processing according to Embodiment 3 and estimation processing according to Embodiment 3.

First, a learning device that executes learning of an estimation model will be described. FIG. 21 is a diagram schematically illustrating an example of a configuration of a learning device according to Embodiment 3. FIG. 22 is a diagram for explaining a flow of learning processing according to Embodiment 3 and estimation processing according to Embodiment 3.

The learning device 220 is realized by, for example, reading a predetermined program in a computer or the like including a ROM, a RAM, a CPU, and the like and executing the predetermined program by the CPU. Further, the learning device 220 includes a communication interface that transmits and receives various types of information to and from another device which is connected in a wired manner or connected via a network or the like. The learning device 220 includes a learning data collection unit 221, an estimation unit 222, a parameter update unit 223, and a repetition control unit 224.

The learning data collection unit 221 collects, as learning data, past device logs and a failed part associated with each appearance pattern of alarms of the device logs. As illustrated in (A) of FIG. 22, the failed part is obtained from a failure ticket indicating information on repairs which is actually executed. Alternatively, the failed part may be estimated by performing the estimation processing in Embodiments 1 and 2.

The estimation unit 222 extracts an appearance pattern of alarms as a feature quantity from the past device logs collected by the learning data collection unit 221 ((1) in FIG. 22). At this time, the estimation unit 222 may cluster the appearance patterns. The estimation unit 222 estimates in which section of the connection equipment illustrated in FIG. 1 a failure has occurred from the appearance pattern of alarms using an estimation model 2221. The estimation model 2221 includes, for example, a neural network (NN).

The estimation unit 222 inputs an appearance pattern of alarms extracted from the past device logs to the estimation model 2221, and acquires a failed part output from the estimation model 2221 as an estimation result.

The parameter update unit 223 updates the parameter of the estimation model 2221 such that the failed part estimated by the estimation model 2221 approaches the failed part that has actually occurred. For example, the parameter update unit 223 updates the parameter of the estimation model 2221 such that the loss is optimized using the loss function indicating the loss of the failed part estimated by the estimation model 2221 with respect to the failed part that has actually occurred.

The repetition control unit 224 determines whether or not a predetermined end condition has been reached. The end condition is, for example, that the parameter update for the estimation model 2221 has reached a predetermined number of times, that the value of the loss used for the parameter update has become equal to or less than a predetermined threshold value, that the update amount of the parameter (a differential value of the loss function value, or the like) has become equal to or less than a predetermined threshold value, or the like.

In a case where the end condition has not been reached, the repetition control unit 224 returns to the estimation unit 222 and causes the estimation unit to execute estimation processing again. In a case where the end condition is reached, the learning device 220 ends the learning processing. As described above, the learning device 220 causes the estimation model 2221 to learn the correspondence relationship between the appearance pattern of the past alarms and the section in which the past failure has occurred ((2) in FIG. 22).

[Estimation Device]

Figure 23:
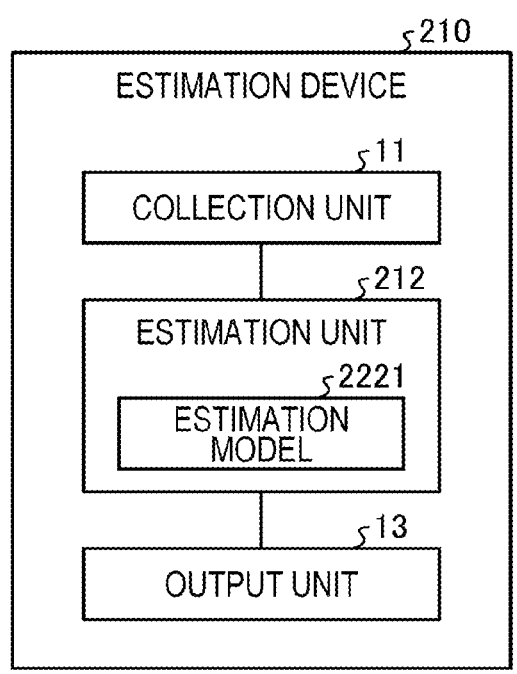
FIG. 23 is a diagram schematically illustrating an example of a configuration of an estimation device according to Embodiment 3.

Next, the estimation device according to Embodiment 3 will be described. FIG. 23 is a diagram schematically illustrating an example of a configuration of the estimation device according to Embodiment 3.

The estimation device 210 is realized by, for example, reading a predetermined program in a computer or the like including a ROM, a RAM, a CPU, and the like and executing the predetermined program by the CPU. Further, the learning device 220 includes a communication interface that transmits and receives various types of information to and from another device which is connected in a wired manner or connected via a network or the like. The learning device 220 includes an estimation unit 212 instead of the estimation unit 12 illustrated in FIG. 4.

As illustrated in (B) of FIG. 22, the estimation unit 212 extracts an appearance pattern of alarms as a feature quantity from the device logs collected by the collection unit 11 ((3) in FIG. 22). At this time, the estimation unit 212 may cluster the appearance patterns. The estimation unit 212 estimates in which section of the connection equipment illustrated in FIG. 1 a failure has occurred from the appearance pattern of alarms using the estimation model 2221 ((4) in FIG. 22). The estimation model 2221 is a model that has learned a correspondence relationship between a type of an appearance pattern of alarms and a failed part by learning processing by the learning device 220, and includes, for example, an NN.

The estimation unit 212 inputs an appearance pattern of alarms collected by the collection unit 11 and extracted from the device logs to the estimation model 2221, and acquires a failed part output from the estimation model 2221 as an estimation result. The estimation unit 212 estimates a failed part by, for example, isolating the failed part according to granularity of the inside of the site, the upper part of the 8SP, the lower part of the 8SP, the ONU main body, and the lower part of the ONU. Furthermore, the estimation unit 212 may estimate the failed part by isolating the lower part of the 8SP according to granularity of the wiring cable and the drop cable.

[Processing Procedure of Learning Processing]

Figure 24:
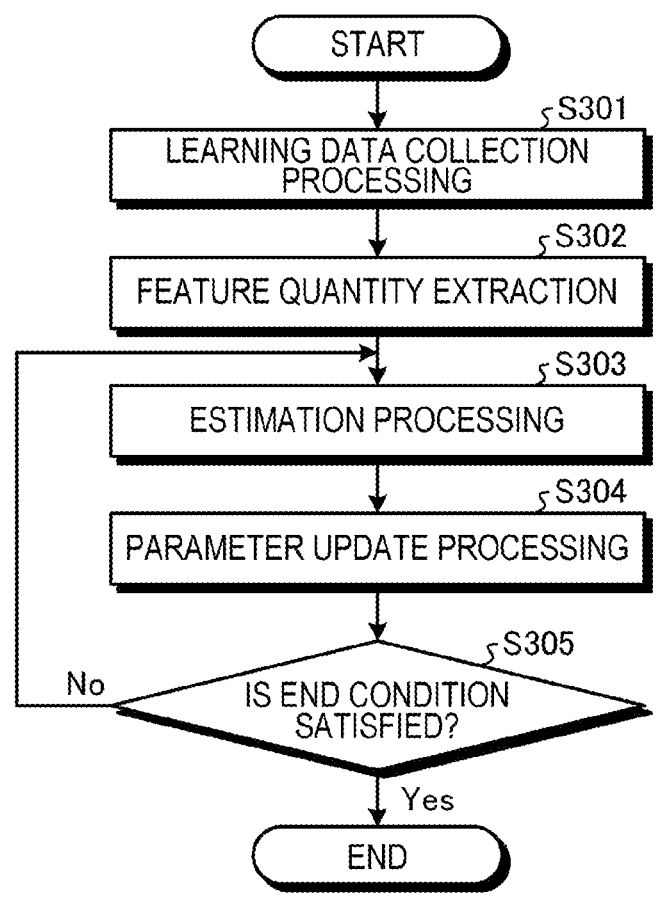
FIG. 24 is a flowchart illustrating a processing procedure of the learning processing according to Embodiment 3.

Next, learning processing executed by the learning device 220 will be described. FIG. 24 is a flowchart illustrating a processing procedure of the learning processing according to Embodiment 3.

As illustrated in FIG. 24, first, the learning data collection unit 221 collects, as learning data, past device logs and a failed part associated with each appearance pattern of alarms of the device logs (step S301).

The estimation unit 222 extracts an appearance pattern of alarms as a feature quantity from the past device logs collected by the learning data collection unit 221 (step S302). The estimation unit 222 performs the estimation processing of estimating in which section of the connection equipment illustrated in FIG. 1 a failure has occurred from the appearance pattern of alarms using the estimation model 2221 (step S303). The estimation unit 222 inputs an appearance pattern of alarms collected by the learning data collection unit 221 and extracted from the device logs to the estimation model 2221, and acquires a failed part output from the estimation model 2221 as an estimation result.

The parameter update unit 223 updates the parameter of the estimation model 2221 such that the failed part estimated by the estimation model 2221 approaches the failed part that has actually occurred (step S304).

The repetition control unit 224 determines whether or not a predetermined end condition has been reached (step S305). In a case where the end condition has not been reached, the repetition control unit 224 returns to step S303 and causes the estimation unit 222 to execute estimation processing again. When the end condition is reached, the learning device 220 outputs the parameter of the estimation model 2221 to the estimation device 210 and ends the learning processing.

[Processing Procedure of Estimation Processing]

Figure 25:
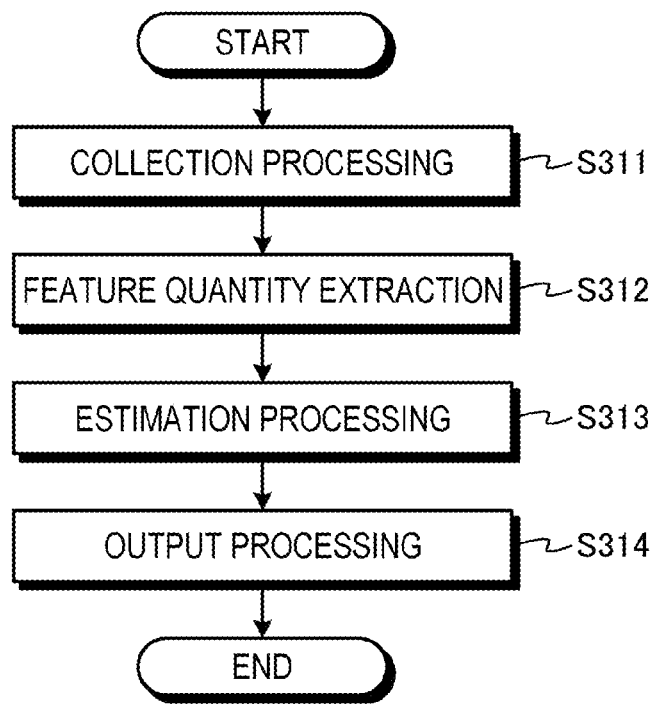
FIG. 25 is a flowchart illustrating a processing procedure of the estimation processing according to Embodiment 3.

Next, learning processing executed by the estimation device 210 will be described. FIG. 25 is a flowchart illustrating a processing procedure of the estimation processing according to Embodiment 3.

Step S311 illustrated in FIG. 25 is the same processing as step S11 illustrated in FIG. 6. The estimation unit 212 extracts an appearance pattern of alarms as a feature quantity from the device logs collected by the collection unit 11 (step S312).

The estimation unit 222 estimates in which section of the connection equipment illustrated in FIG. 1 a failure has occurred from the appearance pattern of alarms using the estimation model 2221 (step S313). The estimation unit 212 inputs an appearance pattern of alarms collected by the collection unit 11 and extracted from the device logs to the estimation model 2221, and acquires a failed part output from the estimation model 2221 as an estimation result. Step S314 illustrated in FIG. 25 is the same processing as step S13 illustrated in FIG. 6.

Effects of Embodiment 3

Figure 26:
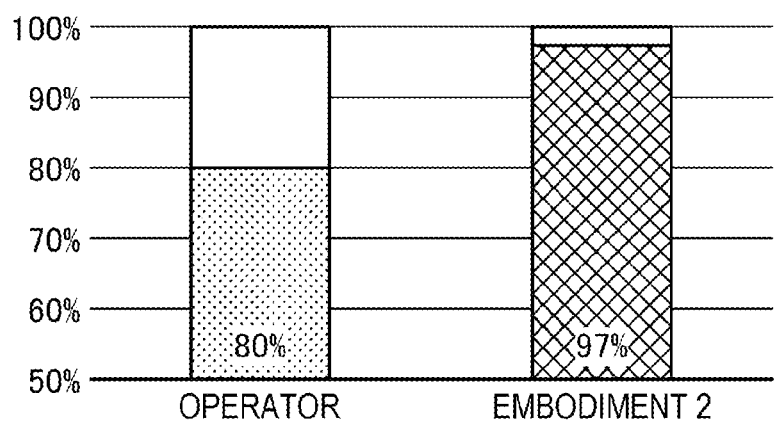
FIG. 26 is a diagram illustrating estimation accuracy of an estimation result for failed parts by an operator and an estimation result for failed parts by the estimation device according to Embodiment 3.

FIG. 26 is a diagram illustrating estimation accuracy of an estimation result for failed parts by an operator and an estimation result for failed parts by the estimation device 210 according to Embodiment 3. As illustrated in FIG. 26, it has been found that the estimation accuracy of approximately 80% in the case of estimation by the operator is improved to 97% by using the estimation device 210.

As described above, in Embodiment 3, the failed part is estimated using the estimation model in which the correspondence relationship between the appearance pattern of the past alarms and the section in which the past failure has occurred is learned in advance, and accordingly, it is possible to accurately estimate in which section of the connection equipment that connects the building in which the telecommunication equipment is accommodated to the user's house a failure has occurred.

Note that the estimation model 2221 can appropriately arrange a repair group or a repair material by learning the details of arrangement corresponding to the failed part and outputting the details of arrangement together with the failed part.

System Configuration of Embodiment

Each component of the estimation devices 10 and 210 and the learning device 220 is functionally conceptual, and does not have to be physically configured as illustrated in FIG. 2. That is, specific forms of distribution and integration of the functions of the estimation devices 10 and 210 and the learning device 220 are not limited to the illustrated forms, and all or a part thereof can be functionally or physically distributed or integrated in any unit according to various loads, usage conditions, and the like.

Further, all or any part of each processing performed in the estimation devices 10 and 210 and the learning device 220 may be implemented by a CPU, a graphics processing unit (GPU), and a program analyzed and executed by the CPU and the GPU. Furthermore, each piece of processing performed in the estimation device 10, the learning device 20, and a signal processing device 100 may be implemented as hardware by wired logic.

Furthermore, among the processing described in the embodiment, all or a part of the processing described as being automatically performed can be manually performed. Alternatively, all or part of the processing described as being performed manually can be automatically performed by a known method. In addition, the above-described and illustrated processing procedures, control procedures, specific names, and information including various data and parameters can be appropriately changed unless otherwise specified.

[Program]

Figure 27:
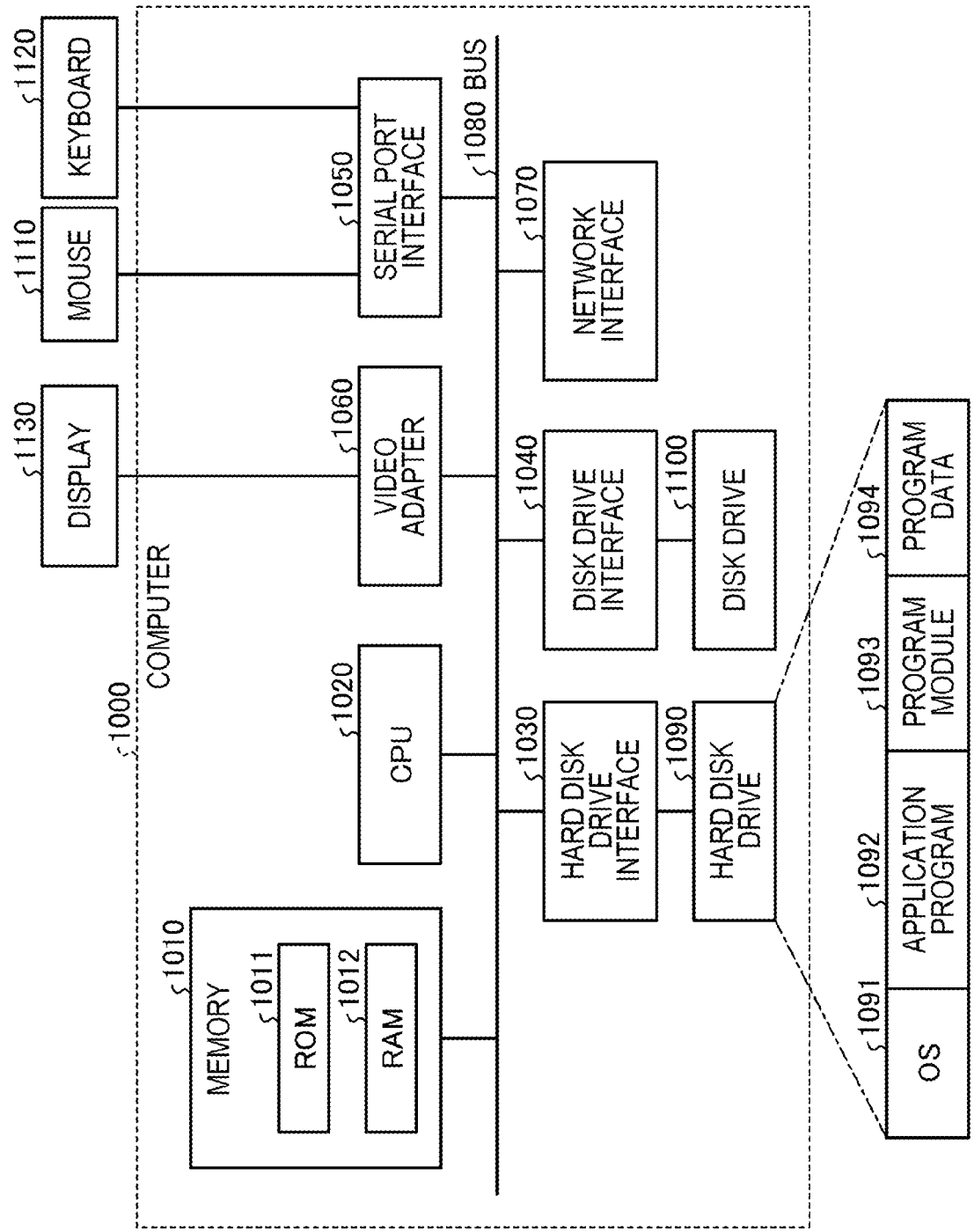
FIG. 27 is a diagram illustrating an example of a computer in which a program is executed and thus the estimation device and the learning device are implemented.

FIG. 27 is a diagram illustrating an example of a computer in which a program is executed and thus the estimation devices 10 and 210 and the learning device 220 are implemented. A computer 1000 includes, for example, a memory 1010 and a CPU 1020. Further, the computer 1000 also includes a hard disk drive interface 1030, a disk drive interface 1040, a serial port interface 1050, a video adapter 1060, and a network interface 1070. These units are connected to each other by a bus 1080.

The memory 1010 includes a ROM 1011 and a RAM 1012. The ROM 1011 stores, for example, a boot program such as a basic input output system (BIOS). The hard disk drive interface 1030 is connected to a hard disk drive 1090. The disk drive interface 1040 is connected with a disk drive 1100. For example, a removable storage medium such as a magnetic disk or an optical disc is inserted into the disk drive 1100. The serial port interface 1050 is connected with, for example, a mouse 1110 and a keyboard 1120. The video adapter 1060 is connected with, for example, a display 1130.

The hard disk drive 1090 stores, for example, an operating system (OS) 1091, an application program 1092, a program module 1093, and program data 1094. That is, the program that defines each piece of processing of the estimation devices 10 and 210 and the learning device 220 is implemented as the program module 1093 in which codes executable by a computer 1000 are described. The program module 1093 is stored in, for example, the hard disk drive 1090. For example, the program module 1093 for executing processing similar to the functional configuration in the estimation devices 10 and 210 and the learning device 220 is stored in the hard disk drive 1090. Note that the hard disk drive 1090 may be replaced with a solid state drive (SSD).

Further, setting data used in the processing of the above-described embodiment is stored, for example, in the memory 1010 or the hard disk drive 1090, as the program data 1094. Then, the CPU 1020 reads and executes the program module 1093 and the program data 1094 stored in the memory 1010 and the hard disk drive 1090 to the RAM 1012 as necessary.

Note that the program module 1093 and the program data 1094 are not limited to being stored in the hard disk drive 1090, and may be stored in, for example, a removable storage medium and read by the CPU 1020 via the disk drive 1100 or the like. Alternatively, the program module 1093 and the program data 1094 may be stored in another computer connected via a network (local area network (LAN), wide area network (WAN), or the like). Then, the program module 1093 and the program data 1094 may be read by the CPU 1020 from another computer via the network interface 1070.

Although the embodiments to which the invention made by the present inventors is applied have been described above, the present invention is not limited by the description and drawings constituting a part of the disclosure of the present invention according to the present embodiments. That is, other embodiments, examples, operation techniques, and the like made by those skilled in the art and the like based on the present embodiment are all included in the scope of the present invention.

REFERENCE SIGNS LIST

10, 210 Estimation device
11 Collection unit
12, 212, 222 Estimation unit
13 Output unit
221 Learning data collection unit
2221 Estimation model
223 Parameter update unit
224 Repetition control unit

The invention claimed is:

1. An estimation device, comprising a processor configured to execute operations comprising:
collecting alarm, wherein the alarm is issued when a device is in an abnormal state, the device is at least a part of connection equipment, the connection equipment connects between a building in which telecommunication equipment is accommodated and a terminal device disposed in a house of an individual user through first branch equipment and second branch equipment, the first branch equipment branches a cable from the telecommunication equipment into a plurality of first core wires, the second branch equipment branches a first core wire of the plurality of first core wires into a plurality of second core wires, and the connection equipment connects a second core wire of the plurality of second core wires to the terminal device; and
estimating a section of the connection equipment where a failure has occurred, based on a type of the collected alarm and the equipment for which the alarm has been issued; wherein
the estimating further comprises estimating presence or absence of a possibility of a failure at a lower part of the terminal device according to presence or absence of output of logs which are issued from a port that corresponds to the terminal device which is an estimation target, based on the history of alarms in the log.

2. The estimation device according to claim 1, wherein
the collecting further comprises collecting logs indicating a history of alarms, and
the estimating further comprises estimating: whether the section in which the failure has occurred is:
inside the building in which the telecommunication equipment is accommodated,
the cable including the plurality of first core wires,
the connection equipment that connects the second core wire from the second branch equipment to the terminal device, or
a main body of the terminal device, based on the history of alarms in the log.

3. The estimation device according to claim 2, wherein
the estimating further comprises determining:
presence or absence of degradation or service disconnection in the first branch equipment,
presence or absence of degradation or service disconnection in the second branch equipment, or
presence or absence of power disconnection of the terminal device based on the history of alarms in the log, and
estimating, according to determination results of each determination of the first branch equipment, the second branch equipment, and the terminal device, whether a section in which a failure has occurred is:
inside a building in which the telecommunication equipment is accommodated,
a cable including the plurality of first core wires,
the connection equipment that connects a second core wire from the second branch equipment to the terminal device, or
a main body of the terminal device.

4. The estimation device according to claim 2, wherein, when the estimating estimates that the section in which the failure has occurred is the connection equipment that connects the second core wire to the terminal device, the estimating further comprises:
estimating that a section in which a failure has occurred is a wiring cable from the second branch equipment to a user wiring point when there is service disconnection in two or more of second core wires of the plurality of second core wires in the same slot of the logs that correspond to each second core wire of the plurality of second core wires based on the history of alarms in the log, and
estimating a section in which a failure has occurred is a section between the terminal device and a drop cable that corresponds to one second core wire among the drop cables from the user wiring point when there is service disconnection only in the one second core wire.

5. The estimation device according to claim 1, wherein the estimating further comprises estimating in which section of the connection equipment the failure has occurred using an estimation model that has learned a correspondence relationship between an appearance pattern of past alarms and a section in which the past failure has occurred.

6. The estimation device according to claim 1, wherein the first branch equipment represents a splitter that splits the cable into the plurality of first core wires, and the plurality of first core wires includes four pieces of core wires.

7. The estimation device according to claim 1, wherein the second branch equipment represents a splitter that splits the first core wire of the plurality of first core wires into the plurality of second core wires, and the plurality of second core wires includes eight pieces of core wires.

8. An estimation method, the estimation method comprising:
collecting an alarm, wherein the alarm is issued when a device is in an abnormal state, the device is at least a part of connection equipment, the connection equipment connects between a building in which telecommunication equipment is accommodated and a terminal device disposed in a house of an individual user through first branch equipment and second branch equipment, the first branch equipment branches a cable from the telecommunication equipment into a plurality of first core wires, the second branch equipment branches a first core wire of the plurality of first core wires into a plurality of second core wires, and the connection equipment connects a second core wire of the plurality of second core wires to the terminal device; and
estimating a section of the connection equipment where a failure has occurred, based on a type of the collected alarm and the equipment for which the alarm has been issued; wherein
the estimating further comprises estimating presence or absence of a possibility of a failure at a lower part of the terminal device according to presence or absence of output of logs which are issued from a port that corresponds to the terminal device which is an estimation target, based on the history of alarms in the log.

9. The estimation method according to claim 8, wherein the collecting further comprises collecting logs indicating a history of alarms, and
the estimating further comprises estimating: whether the section in which the failure has occurred is:
inside the building in which the telecommunication equipment is accommodated,
the cable including the plurality of first core wires,
the connection equipment that connects the second core wire from the second branch equipment to the terminal device, or
a main body of the terminal device, based on the history of alarms in the log.

10. The estimation method according to claim 8, wherein the estimating further comprises estimating in which section of the connection equipment the failure has occurred using an estimation model that has learned a correspondence relationship between an appearance pattern of past alarms and a section in which the past failure has occurred.

11. The estimation method according to claim 8, wherein the first branch equipment represents a splitter that splits the cable into the plurality of first core wires, and the plurality of first core wires includes four pieces of core wires.

12. The estimation method according to claim 8, wherein the second branch equipment represents a splitter that splits the first core wire of the plurality of first core wires into the plurality of second core wires, and the plurality of second core wires includes eight pieces of core wires.

13. The estimation method according to claim 9, wherein the estimating further comprises:
determining:
presence or absence of degradation or service disconnection in the first branch equipment,
presence or absence of degradation or service disconnection in the second branch equipment, or
presence or absence of power disconnection of the terminal device based on the history of alarms in the log, and
estimating, according to determination results of each determination of the first branch equipment, the second branch equipment, and the terminal device, whether a section in which a failure has occurred is:
inside a building in which the telecommunication equipment is accommodated,
a cable including the plurality of first core wires,
the connection equipment that connects a second core wire from the second branch equipment to the terminal device, or
a main body of the terminal device.

14. The estimation method according to claim 9, wherein, when the estimating estimates that the section in which the failure has occurred is the connection equipment that connects the second core wire to the terminal device, the estimating further comprises:
estimating that a section in which a failure has occurred is a wiring cable from the second branch equipment to a user wiring point when there is service disconnection in two or more second core wires of the plurality of second core wires in the same slot of the logs that correspond to each second core wire of the plurality of second core wires based on the history of alarms in the log, and
estimating a section in which a failure has occurred is a section between the terminal device and a drop cable that corresponds to one second core wire among the drop cables from the user wiring point when there is service disconnection only in the one second core wire.

15. A computer-readable non-transitory recording medium storing computer-executable program instructions that when executed by a processor cause a computer to execute operations comprising:
collecting an alarm, wherein the alarm is issued when a device is in an abnormal state, the device is at least a part of connection equipment, the connection equipment connects between a building in which telecommunication equipment is accommodated and a terminal device disposed in a house of an individual user through first branch equipment and second branch equipment, the first branch equipment branches a cable from the telecommunication equipment into having a plurality of first core wires, the second branch equipment branches a first core wire of the plurality of first core wires into a plurality of second core wires, and the connection equipment connects a second core wire of the plurality of second core wires to the terminal device, and estimating a section of the connection equipment where a failure has occurred, based on a type of the collected alarm and the equipment for which the alarm has been issued; wherein the estimating further comprises estimating presence or absence of a possibility of a failure at a lower part of the terminal device according to presence or absence of output of logs which are issued from a port that corresponds to the terminal device which is an estimation target, based on the history of alarms in the log.

16. The computer-readable non-transitory recording medium according to claim 15, wherein the collecting further comprises collecting logs indicating a history of alarms, and the estimating further comprises estimating: whether the section in which the failure has occurred is:

inside the building in which the telecommunication equipment is accommodated, the cable including the plurality of first core wires, the connection equipment that connects the second core wire from the second branch equipment to the terminal device, or a main body of the terminal device, based on the history of alarms in the log.

17. The computer-readable non-transitory recording medium according to claim 15, wherein the estimating further comprises estimating in which section of the connection equipment the failure has occurred using an estimation model that has learned a correspondence relationship between an appearance pattern of past alarms and a section in which the past failure has occurred.

18. The computer-readable non-transitory recording medium according to claim 15, wherein the first branch equipment represents a first splitter that splits the cable into the plurality of first core wires, and the plurality of first core wires includes four pieces of core wires, and the second branch equipment represents a second splitter that splits the first core wire of the plurality of first core wires into the plurality of second core wires, and the plurality of second core wires includes eight pieces of core wires.

* * * * *